US009845369B2

(12) United States Patent
Hottovy et al.

(10) Patent No.: US 9,845,369 B2
(45) Date of Patent: Dec. 19, 2017

(54) PRESSURE CONTROL TO REDUCE PUMP POWER FLUCTUATIONS

(71) Applicant: Chevron Phillips Chemical Company LP, The Woodlands, TX (US)

(72) Inventors: John D. Hottovy, Porter, TX (US); Scott E. Kufeld, Houston, TX (US)

(73) Assignee: Chevron Philips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/423,726

(22) Filed: Feb. 3, 2017

(65) Prior Publication Data

US 2017/0313798 A1 Nov. 2, 2017

Related U.S. Application Data

(63) Continuation of application No. 15/142,279, filed on Apr. 29, 2016, now Pat. No. 9,593,189.

(51) Int. Cl.
*C08F 2/00* (2006.01)
*C08F 210/00* (2006.01)
(Continued)

(52) U.S. Cl.
CPC ............ *C08F 210/16* (2013.01); *G01L 13/00* (2013.01)

(58) Field of Classification Search
CPC .. C08F 210/16; B01J 19/0006; B01J 19/1837; B01J 19/2435
(Continued)

(56) References Cited

U.S. PATENT DOCUMENTS 3,248,179 A   4/1966  Norwood
3,998,995 A   12/1976 Buss et al.
(Continued)

FOREIGN PATENT DOCUMENTS

EP    0124333 A2    11/1984
EP    1563903 A1    8/2005

OTHER PUBLICATIONS

"Red Sox as an illustration of Bayesian Probability Theory," http://www.bankers-anonymous.com/blog/red-sox-as-an-illustration-of-bayesian-probabiltiy-theory/, Oct. 3, 2013, 9 pages, Bankers Anonymous.
(Continued)

*Primary Examiner* — William Cheung
(74) *Attorney, Agent, or Firm* — Conley Rose, P.C.; Rodney B. Carroll; Monte R. Rhodes

(57) ABSTRACT

In an embodiment, a polymerization process comprises circulating, with a pump, a reaction mixture slurry in a polymerization loop reactor during a polymerization process, detecting a pressure change in the reaction mixture slurry downstream of the pump, generating, by a pressure controller, a takeoff valve actuation signal for a takeoff valve based on the pressure change, generating, by the pressure controller, a correction to the takeoff valve actuation signal, generating, by the pressure controller, a time delay for the correction, applying the correction to the takeoff valve actuation signal to generate a corrected takeoff valve actuation signal, providing the corrected takeoff valve actuation signal to the takeoff valve after the time delay, and adjusting a position of the takeoff valve in response to providing the corrected takeoff valve actuation signal. The reactor pressure is based on the takeoff valve position.

20 Claims, 5 Drawing Sheets

(51) Int. Cl.
  *G05D 16/00* (2006.01)
  *B01J 19/18* (2006.01)
  *B01D 11/02* (2006.01)
  *C08F 210/16* (2006.01)
  *G01L 13/00* (2006.01)

(58) Field of Classification Search
  USPC .................... 526/64, 348; 422/113, 132, 281
  See application file for complete search history.

(56) References Cited

U.S. PATENT DOCUMENTS

| | | | |
|---|---|---|---|
| 4,054,780 A | 10/1977 | Bartley et al. | |
| 4,501,885 A | 2/1985 | Sherk et al. | |
| 5,565,175 A | 10/1996 | Hottovy et al. | |
| 5,575,979 A | 11/1996 | Hanson | |
| 6,239,235 B1 | 5/2001 | Hottovy et al. | |
| 6,262,191 B1 | 7/2001 | Hottovy et al. | |
| 7,163,906 B2 | 1/2007 | McDaniel et al. | |
| 7,577,527 B2 | 8/2009 | Vega Velasquez | |
| 7,619,047 B2 | 11/2009 | Yang et al. | |
| 7,645,841 B2 | 1/2010 | Shaw et al. | |
| 7,790,820 B2 | 9/2010 | Jensen et al. | |
| 7,960,487 B2 | 6/2011 | Yang et al. | |
| 8,255,353 B2 * | 8/2012 | Zhang | G06N 7/02 706/52 |
| 8,380,642 B2 | 2/2013 | Stundner et al. | |
| 8,457,897 B2 | 6/2013 | Hehmeyer | |
| 8,762,321 B2 | 6/2014 | Joanni et al. | |
| 9,593,189 B1 | 3/2017 | Hottovy et al. | |
| 2010/0205138 A1 * | 8/2010 | Zhang | G06N 7/02 706/52 |

OTHER PUBLICATIONS

Huang, Biao, "Bayesian Methods for Control Loop Monitoring and Diagnosis," Journal of Process Control, Oct. 2008, 11 pages, vol. 18, Issue 9, Elsevier Ltd.

"The Smith Predictor," http://mchlab.ee.nus.edu.sg/matlab/Smit/theory3.html, downloaded from Internet on Jun. 24, 2015, 2 pages.

Triola, Mario F., "Bayes' Theorem," 2010, pp. 1-9, Pearson Education, Inc.

Vandoren, Vance, "Overcoming process deadtime with a Smith Predictor," http://www.controleng.com/single-article/overcoming-process-deadtime-with-a-smith-predictor/8c727a1371eb45011801350175606812.html, Feb. 17, 2015, 3 pages.

Vodencarevic, ASIM, "Design of PLC-based Smith Predictor for Controlling Processes with Long Dead Time," Proceedings of the International MultiConference of Engineers and Computer Scientists, 2010, 6 pages, vol. II, IMECS.

* cited by examiner

PRESSURE CONTROL TO REDUCE PUMP POWER FLUCTUATIONS

CROSS-REFERENCE TO RELATED APPLICATIONS

This application is a continuation of and claims priority to U.S. patent application Ser. No. 15/142,279 filed Apr. 29, 2016, now U.S. Pat. No. 9,593,189 and entitled "Pressure Control to Reduce Pump Power fluctuations," which is incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD

This disclosure relates to controlling pressure fluctuations in a polymerization reactor system.

BACKGROUND

Polyolefins such as polyethylene and polypropylene may be prepared in a number of ways, including by slurry polymerization. In this technique, feed materials such as diluent, monomer and catalyst are introduced to a loop reaction zone, forming a "slurry" in the reaction zone. In continuous loop reactors, the slurry circulates through the loop reaction zone with the help of a reactor circulation pump, and the monomer reacts in the presence of the catalyst in a polymerization reaction. The polymerization reaction yields solid polyolefins in the slurry. A polymerization product stream having solid polyolefins is then transferred from the reactor and separated to recover the solid polyolefins.

In general, a portion of reactor contents (e.g., polymerization product) can be removed from the reactor to control reactor pressure, which in turn could lead to fluctuations in reactor circulation pump power. Pump power fluctuations could have adverse effects on polyolefin production.

SUMMARY

In an embodiment, a polymerization process comprises circulating, with a pump, a reaction mixture slurry in a polymerization loop reactor during a polymerization process, detecting a pressure change in the reaction mixture slurry downstream of the pump, generating, by a pressure controller, a takeoff valve actuation signal for a takeoff valve based on the pressure change, generating, by the pressure controller, a correction to the takeoff valve actuation signal, generating, by the pressure controller, a time delay for the correction, applying the correction to the takeoff valve actuation signal to generate a corrected takeoff valve actuation signal, providing the corrected takeoff valve actuation signal to the takeoff valve after the time delay, and adjusting a position of the takeoff valve in response to providing the corrected takeoff valve actuation signal. The reaction mixture slurry comprises an olefin, a catalyst, and polymer particles, and a portion of the reaction mixture slurry is continually removed from the polymerization reactor in proportion to the takeoff valve position. The reaction mixture slurry is retained in the polymerization reactor when the takeoff valve is in a closed position, and the reactor pressure is based on the takeoff valve position. The pressure change can be a pressure increase of the reaction mixture slurry. The takeoff valve actuation signal can cause the takeoff valve to move towards the open position in response to the pressure increase, and the correction can reduce an amount to which the takeoff valve moves towards the open position. The pressure change can be a pressure decrease of the reaction mixture slurry. The takeoff valve actuation signal can cause the takeoff valve to move towards the closed position in response to the pressure increase, and the correction can reduce an amount to which the takeoff valve moves towards the closed position. The time delay can be based on a time for the reaction mixture to flow from the pump to the takeoff valve in the polymerization reactor. A magnitude of the correction can be based on a change in a pump power of the pump relative to a time average of the pump power, and the time average of the pump power can be an average pump power over a time corresponding to between 1 and 10 circulation periods of the reaction mixture slurry through the polymerization loop reactor. Applying the correction can reduce a pump power fluctuation of the pump compared to adjusting the position of the takeoff valve using the takeoff valve actuation signal without applying the correction. The correction can be between about 0.1% and about 1% of a signal range of the takeoff valve actuation signal. The polymerization process can also include applying a tuning factor between about 1% and about 50% to the correction prior to applying the correction to the takeoff valve actuation signal. The pump can be at least one of an axial flow pump, a mix flow pump, or a radial flow pump. A concentration of the polymer particles in the reaction mixture slurry can be greater than about 40 wt %. The concentration of the polymer particles in an outlet line downstream of the takeoff valve can be greater than an average polymer particle concentration of the reaction mixture.

In an embodiment, a polymerization process comprises circulating a reaction mixture slurry in a polymerization loop reactor during a polymerization process, detecting a pressure change in the reaction mixture slurry at the pressure sensor, generating, by a pressure controller in signal communication with the pressure sensor, a first takeoff valve actuation signal for the first takeoff valve and a second takeoff valve actuation signal for the second takeoff valve based on the pressure change, generating, by the pressure controller, a first correction to the first takeoff valve actuation signal, generating, by the pressure controller, a first time delay for the first correction, applying the first correction to the first takeoff valve actuation signal after the first time delay to generate a first corrected takeoff valve actuation signal, generating, by the pressure controller, a second correction to the second takeoff valve actuation signal, generating, by the pressure controller, a second time delay for the second correction, applying the second correction to the second takeoff valve actuation signal after the second time delay to generate a second corrected takeoff valve actuation signal, and adjusting a position of the takeoff valve during the polymerization process in response to the first corrected takeoff valve actuation signal and the second corrected takeoff valve actuation signal. The reaction mixture slurry comprises an olefin, a catalyst, and a polymer product. The polymerization loop reactor comprises a pump, and the pump is disposed in-line in the polymerization loop reactor. A pressure sensor is disposed downstream of the pump, a first takeoff valve is disposed downstream of the pump, and a second takeoff valve is disposed downstream of the first takeoff valve. The first time delay is based on a distance between the first takeoff control valve and the pump, and the second time delay is based on a distance between the second takeoff control valve and the pump. The polymerization process can also include removing a portion of the reaction mixture slurry from the polymerization loop reactor the first takeoff valve, the second takeoff valve, or both, and changing the concentration of polymer particles downstream of the first takeoff valve, the second takeoff valve, or both in response to moving the first takeoff valve, the second takeoff valve, or both towards the open position. A portion of the reaction mixture slurry can be removed from the polymerization reactor when the first takeoff valve, the second takeoff valve, or both are in an open position, and the reaction mixture slurry can be retained in the polymerization reactor when the first takeoff valve, the second takeoff valve, or both are in a closed position. Adjusting the position of the first takeoff valve, the second takeoff valve, or both can include moving the first takeoff valve, the second takeoff valve, or both towards the open position. The polymerization process can also include generating a pressure reduction at the first pressure sensor or the second pressure sensor in response to changing the concentration of polymer particles of the reaction mixture downstream of the takeoff valve. A magnitude of the one or more corrections can be based on a change in a pump power of the pump. The one or more corrections can include a portion of a signal range of the takeoff valve actuation signal. The one or more corrections can be limited to between about 0.1% and about 1% of the signal range of the takeoff valve actuation signal.

In an embodiment, a method of controlling a polymerization process comprises circulating a reaction mixture slurry comprising an olefin, a catalyst, and a polymer product in a polymerization reactor during a polymerization process, detecting, by sensor, at least one condition within the polymerization reactor during the polymerization process, detecting, by a pump power sensor, a pumping power fluctuation of at least one pump used in the circulating of the reaction mixture slurry, developing, by a processor, a probability network, transferring the at least one condition and the pumping power fluctuation to the probability network, determining, by the processor, the probability that the at least one condition is a cause of the pumping power fluctuation, determining that the probability that the at least one condition is a cause of the pumping power fluctuation is above a threshold, controlling the at least one condition when the probability that the at least one condition is a cause of the pumping power fluctuation is above a threshold, and reducing the pumping power fluctuation in response to controlling the at least one condition. The probability network can be a Bayesian network. The at least one condition can comprise a pressure change of the reaction mixture slurry downstream of the at least one pump. Controlling the at least one condition can include generating, by the processor, a takeoff valve actuation signal for a takeoff valve based on the pressure change, generating, by the processor, a correction to the takeoff valve actuation signal, applying the correction to the takeoff valve actuation signal to generate a corrected takeoff valve actuation signal, and adjusting a position of the takeoff valve in response to the corrected takeoff valve actuation signal. Controlling the at least one condition can also include generating, by the processor, a time delay for the correction. Applying the correction can include applying the correction to the takeoff valve actuation signal after the time delay. The time delay can be based on a time for the reaction mixture slurry to travel from the takeoff control valve to the at least one pump. The correction can be between about 0.1% and about 1% of a signal range of the takeoff valve actuation signal. The method can also include applying a tuning factor between about 1% and about 50% to the correction prior to applying the correction to the takeoff valve actuation signal. The at least one condition comprises one or more of: a concentration of the olefin in the reaction mixture slurry, a concentration of the catalyst in the reaction mixture slurry, a concentration of the alpha olefin reaction product in the reaction mixture slurry, a composition of the catalyst, a composition of the olefin, a composition of the alpha olefin reaction product, a density of the reaction mixture slurry, a composition of the diluent, a pressure within the polymerization reactor, an average temperature of the reaction mixture slurry, a flowrate of the reaction mixture, a temperature of a coolant inlet in a heat transfer portion of the polymerization reactor, or any combination thereof. The polymerization reactor can be a loop slurry reactor, a continuous stirred tank reactor, or a plug flow reactor.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Disclosed herein are embodiments of a polymerization reactor system and a process for operating the polymerization reactor system with controlling power fluctuations in reactor circulation pumps.

Figure 1:
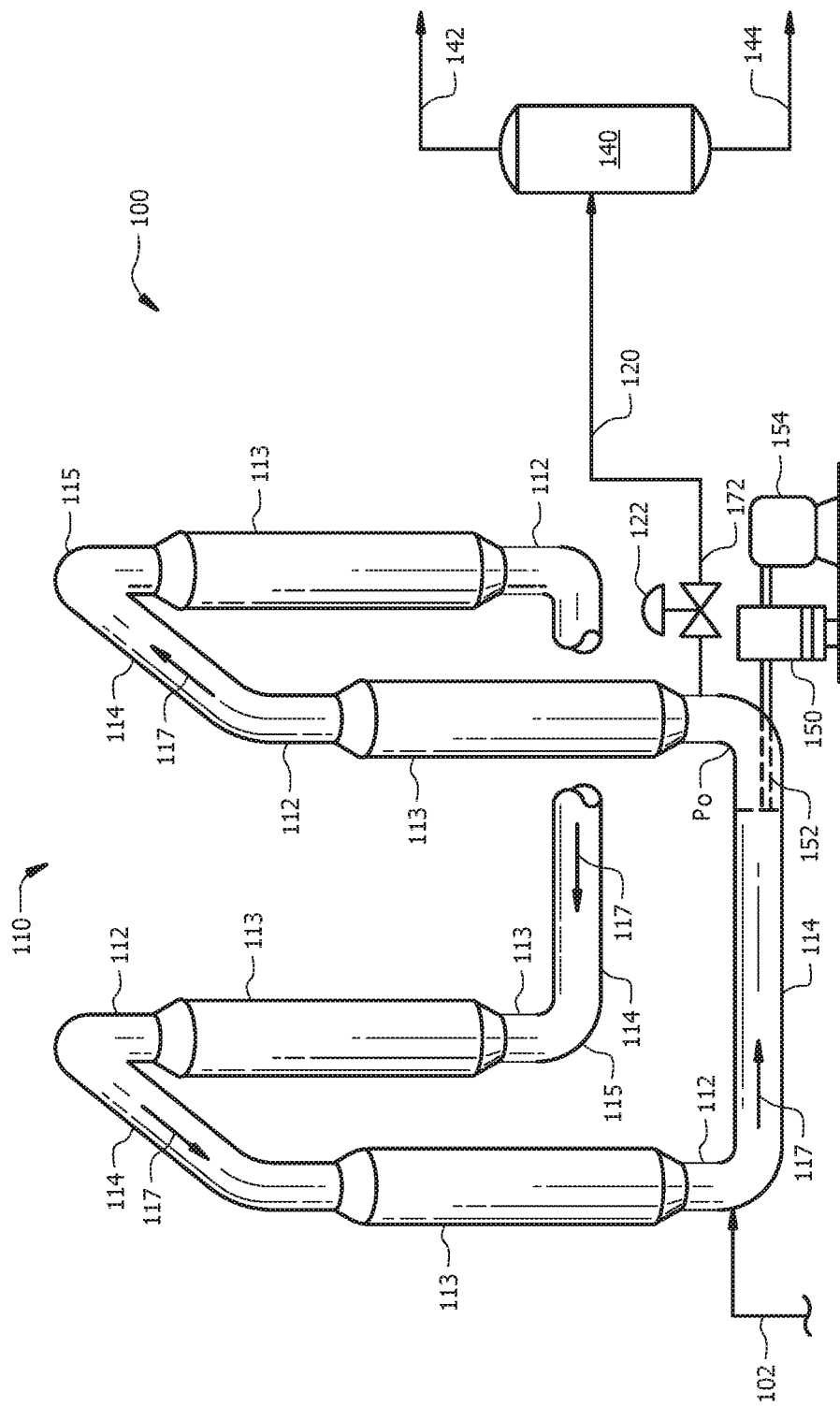
FIG. 1 schematically illustrates a process flow diagram of an embodiment of a loop polymerization process.

FIG. 1 illustrates a schematic process flow diagram of an embodiment of a polymerization system 100. The system 100 may comprise a loop slurry polymerization reactor 110 which forms polymerization product, a first line 120, which receives a polymerization product (e.g., a polymerization product slurry) from the loop slurry polymerization reactor 110 via a takeoff valve 122, and a separation vessel 140, which receives the polymerization product (e.g., as the polymerization product slurry) from the first line 120. Solid polymer may be recovered from the separation vessel 140.

As disclosed above, the system 100 may comprise a loop slurry polymerization reactor 110. In one or more of the embodiments disclosed herein, the reactor 110 may comprise any vessel or combination of vessels suitably configured to provide an environment for a chemical reaction (e.g., a contact zone) between monomers (e.g., ethylene), polymers (e.g., an "active" or growing polymer chain), or both and optionally comonomers (e.g., 1-butene, 1-hexene), copolymers, or both, in the presence of a catalyst to yield a polymer (e.g., a polyethylene polymer), a copolymer, or both. Although the embodiment illustrated in FIG. 1 shows a single reactor 110, one of skill in the art viewing this disclosure will recognize that any suitable number and configuration of reactors (such as a dual reactor system 170 in FIG. 2) may be employed, as described in more detail herein.

As used herein, the terms "polymerization reactor" or "reactor" may include at least one loop slurry polymerization reactor capable of polymerizing olefin monomers or comonomers to produce homopolymers or copolymers. Such homopolymers and copolymers may be equivalently referred to herein as resins or polymers.

The polymerization processes performed in the reactor(s) (e.g., reactor 110) may include batch or continuous processes. Continuous processes could use intermittent or continuous product discharge. Processes may also include partial or full direct recycle of unreacted monomer, unreacted comonomer, diluent, or any combination thereof.

Figure 2:
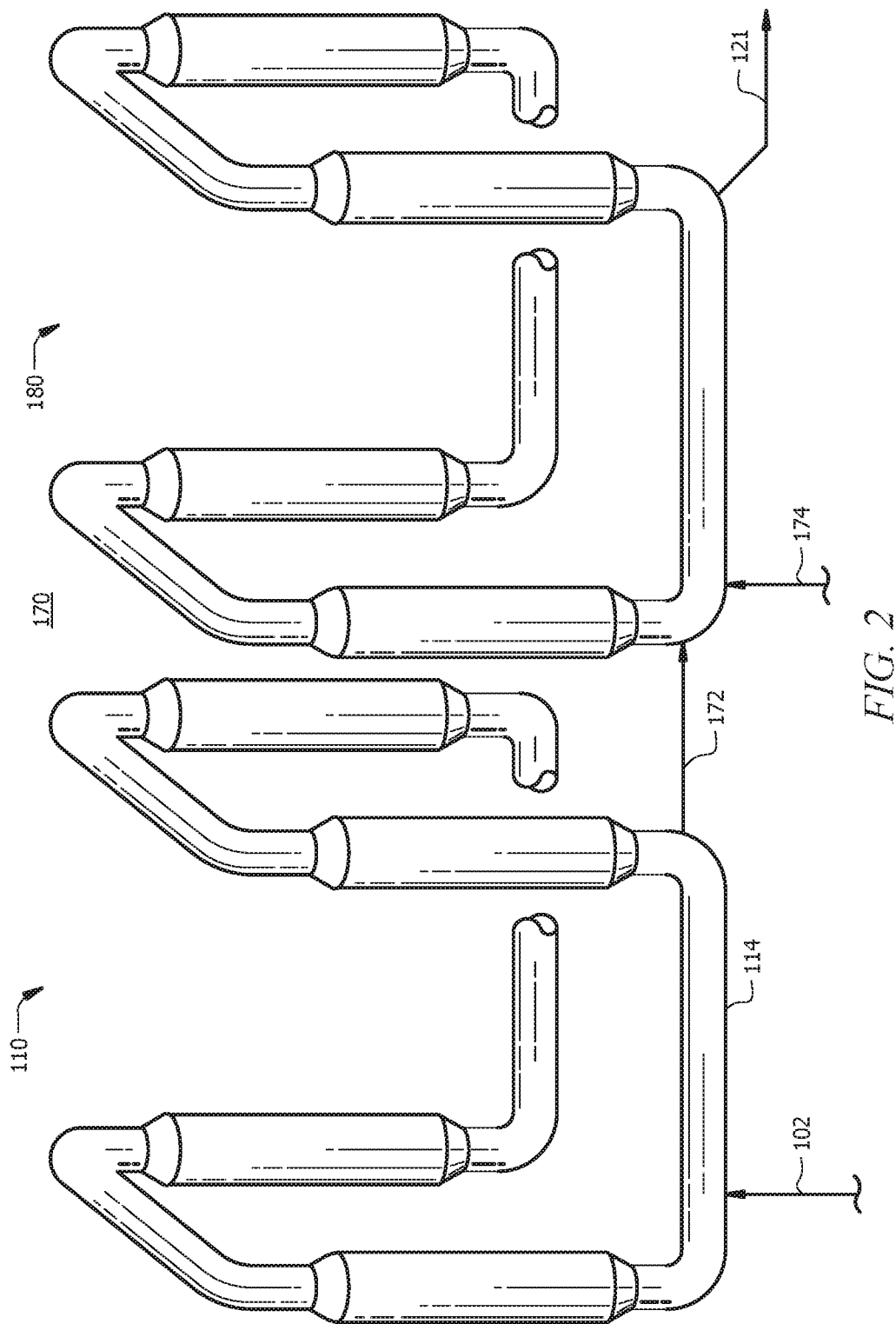
FIG. 2 schematically illustrates another process flow diagram of an embodiment of a loop polymerization process.

In embodiments having multiple reactors as shown in FIG. 2, which illustrates a schematic process flow diagram of an embodiment of a polymerization system 170, production of polymerization product in multiple reactors 110, 180 may include several stages in at least two separate polymerization reactors 110, 180 interconnected by a transfer device or line 172 making it possible to transfer the polymerization product resulting from a first polymerization reactor 110 into a second reactor 180. The desired polymerization conditions in one reactor may be different from the polymerization conditions of the other reactor(s). Alternatively, polymerization in multiple reactors may include the manual transfer of polymerization product (e.g., in a polymerization product slurry, as a mixture, as solid polymer, or combinations thereof) from one reactor to subsequent reactors for continued polymerization. In addition to transferring some portion of the polymerization product to the second reactor 180, one or more components of the feed (e.g., diluent, catalyst, monomers, comonomers, etc.) may be fed through an inlet line as feed stream 174 into the second reactor 180. While illustrated in FIG. 2 as multiple loop reactors, multiple reactor systems may include any combination including, but not limited to, multiple loop reactors, a combination of loop and gas reactors, or multiple high pressure reactors. The multiple reactors may be operated in series, in parallel, or combinations thereof.

Returning to FIG. 1, the loop slurry polymerization reactor 110 may comprise vertical pipes 112, horizontal pipes 114, or both interconnected by smooth bends or elbows 115, which together form a loop. Portions of the loop slurry polymerization reactor 110, such as pipes 112, may have cooling jackets 113 placed therearound to remove excess heat generated by the exothermic polymerization reactions. A cooling fluid may be circulated through an annulus between the jackets 113 and the outer surface of the reactor 110, for example. The circulation of the cooling fluid may remove heat from the loop slurry polymerization reactor 110 through the reactor wall. The cooling fluid may be circulated to a cooling system to discharge the heat before returning to the annular region in a cooling cycle. The cooling jacket(s) 113 may only cover a portion of the loop slurry polymerization reactor 110 and the intermediate regions may not be subject to heat transfer (e.g., heat removal). In an embodiment, at least about 10%, at least about 20%, at least about 30%, at least about 40%, at least about 50%, at least about 60%, at least about 70%, at least about 80%, at least about 90%, or at least about 95% of the outer surface of the loop slurry polymerization reactor 110 may be subject to heat exchange.

A motive device, such as pump 150, may circulate a fluid slurry (e.g., reaction mixture slurry) in the loop slurry polymerization reactor 110. An example of the pump 150 is an in-line axial flow pump with a pump impeller 152 disposed within the interior of the reactor 110. The impeller 152 may, during operation, create a turbulent mixing zone within a fluid medium circulating through the reactor 110 such that sufficient contact between different polymerization components within the slurry may occur. The impeller 152 may also assist in propelling the slurry through the closed loop of the reactor 110 at sufficient speed to keep solid particulates, such as the catalyst or polymerization product, suspended within the slurry. The slurry may flow through the loop in the direction indicated by flow arrows 117. The impeller 152 may be driven by a motor 154 or other motive force. Nonlimiting examples of motive devices suitable for use in the present disclosure include an axial flow pump, a mix flow pump, a radial flow pump, and the like, or combinations thereof.

The system 100 may additionally comprise any equipment associated with a polymerization reactor, such as pumps, control devices (e.g., a PID controller), measurement instruments (e.g., thermocouples, transducers, and flow meters), alternative inlet and outlet lines, and the like.

Monomer, diluent, catalyst, and optionally any comonomer, which may be fed to the slurry loop polymerization reactor 110 (e.g., via feed stream 102), may circulate through the loop as polymerization occurs. Generally, continuous processes may comprise the continuous introduction of a monomer, an optional comonomer, a catalyst, and a diluent into the loop slurry polymerization reactor 110 and the continuous removal (e.g., via first line 120) of a slurry comprising solid polymer (e.g., polyethylene) and a liquid phase of the diluent.

In one or more embodiments, a comonomer may comprise unsaturated hydrocarbons having from 3 to 20 carbon atoms. For example, a comonomer may comprise alpha olefins, such as for example propene (propylene), 1-butene, 1-pentene, 1-hexene, 3-methyl-1-butene, 4-methyl-1-pentene, 1-heptene, 1-octene, 1-nonene, 1-decene, and the like, or combinations thereof.

In embodiments, suitable diluents used in slurry polymerization processes may include, but are not limited to, the monomer, and optionally, the comonomer, being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. In embodiments, diluents may comprise unsaturated hydrocarbons having 3 to 12 carbon atoms. Further examples of suitable diluents include, but are not limited to, propene, 1-butene, 1-hexene, octenes, or combinations thereof. Some loop polymerization reactions can occur under bulk conditions where no diluent is used.

Additional information for typical loop polymerization processes is disclosed, for example, in U.S. Pat. Nos. 3,248,179; 4,501,885; 5,565,175; 5,575,979; 6,239,235; and 6,262,191; each of which is incorporated by reference in its entirety herein.

In embodiments having multiple reactors, various types of reactors that may additionally be included in system 100 may comprise gas-phase reactors. Gas-phase reactors may comprise fluidized bed reactors or staged horizontal reactors. Gas-phase reactors may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Likewise, copolymer product may optionally be withdrawn from the reactor and new or fresh comonomer may be added to replace polymerized comonomer, polymerized monomer, or combinations thereof. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In embodiments having multiple reactors, various types of reactors that may additionally be included in system 100 may comprise loop slurry polymerization reactors. Such reactors may have a loop configuration, such as the configuration of the loop slurry polymerization reactor 110 of FIG. 1.

In embodiments having multiple reactors, various types of reactors that may additionally be included in system 100 may comprise high pressure reactors. High pressure reactors may comprise autoclave and/or tubular reactors. Tubular reactors may have several zones where fresh monomer (and optionally, comonomer), initiators, or catalysts may be added. Monomer (optionally, comonomer) may be entrained in an inert gaseous stream and introduced at one zone of the reactor. Initiators, catalysts, catalyst components, or combinations thereof may be entrained in a gaseous stream and introduced at another zone of the reactor. The gas streams may be intermixed for polymerization. Heat and pressure may be employed appropriately to obtain optimal polymerization reaction conditions.

In embodiments having multiple reactors, various types of reactors that may additionally be included in system 100 may comprise a solution polymerization reactor wherein the monomer (optionally, comonomer) may be contacted with the catalyst composition by suitable stirring or other means. A carrier comprising an inert organic diluent or excess monomer (optionally, comonomer) may be employed. If desired, the monomer, the optional comonomer, or both may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means may be utilized for dissipating the exothermic heat of polymerization.

Conditions of a polymerization reactor, e.g., loop slurry polymerization reactor 110 which may be chosen and even controlled for polymerization efficiency and to provide resin properties, can include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes the range from about 140° F. (about 60° C.) to about 536° F. (about 280° C.), for example, and from about 158° F. (about 70° C.) to about 230° F. (about 110° C.), depending upon the type of polymerization reactor.

Suitable pressures will also vary according to the reactor and polymerization type. The pressure for liquid phase polymerizations in a loop reactor such as loop slurry polymerization reactor 110 is typically less than about 1,000 psig (about 6.9 MPa), for example, about 650 psig (about 4.5 MPa). Pressure for gas phase polymerization is usually at a pressure from about 200 psig (about 1.4 MPa) to about 500 psig (about 3.5 MPa). High pressure polymerization in tubular or autoclave reactors is generally run at about 20,000 psig (about 137.9 MPa) to about 75,000 psig (about 517.1 MPa). Polymerization reactors can also be operated in a supercritical region occurring at generally higher temperatures and pressures. Operation above the critical point of a pressure/temperature diagram (supercritical phase) may offer advantages. In an embodiment, polymerization may occur in an environment having a suitable combination of temperature and pressure. For example, polymerization may occur at a pressure in a range of about 400 psig (about 2.8 MPa) to about 1,000 psig (about 6.9 MPa); alternatively, about 550 psig (about 3.8 MPa) to about 650 psig (about 4.5 MPa), alternatively, about 600 psig (about 4.1 MPa) to about 625 psig (about 4.3 MPa); and a temperature in a range of about 150° F. (about 66° C.) to about 230° F. (about 110° C.), alternatively, from about 195° F. (about 91° C.) to about 220° F. (about 104° C.).

The concentration of various reactants can be controlled to produce solid polymer with certain physical and mechanical properties. The proposed end-use product that will be formed by the solid polymer and the method of forming that product determines the desired properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations, the partial pressures, or both of monomer, comonomer, hydrogen, co-catalyst, activator-support, modifiers, and electron donors are important in producing these resin properties. Comonomer may be used to control product density. Hydrogen may be used to control product molecular weight. Co-catalysts can be used to alkylate, scavenge poisons and control molecular weight. Activator-support can be used to activate and support the catalyst. Modifiers can be used to control product properties and electron donors affect stereoregularity, the molecular weight distribution, or molecular weight. In addition, the concentration of poisons is minimized because poisons impact the reactions and product properties.

Polymerization reaction components of the reactor(s) disclosed herein (e.g., loop slurry polymerization reactor 110) may include olefin monomers (e.g., ethylene) and comonomers (e.g., 1-hexene), diluent (e.g., isobutane, hexane, propane, or combinations thereof), molecular weight control agents (e.g., hydrogen), and any other desired co-reactants or additives. Polymerization reaction components may additionally include a catalyst, and optionally, a co-catalyst. Suitable catalyst for polymerizing the monomers and any comonomers may include, but is not limited to a catalyst(s) and, optionally, a co-catalyst(s), a promoter(s), or any combination thereof. Nonlimiting examples of suitable catalyst systems include Ziegler Natta catalysts, Ziegler catalysts, chromium catalysts, chromium oxide catalysts, chromocene catalysts, metallocene catalysts, nickel catalysts, or combinations thereof. Nonlimiting examples of co-catalyst include triethylboron, methyl aluminoxane, alkyls such as triethylaluminum, or combinations thereof. Suitable activator-supports may comprise solid super acid compounds. Catalyst systems suitable for use in this disclosure have been described, for example, in U.S. Pat. Nos. 7,619,047; 7,790,820; 7,163,906; and 7,960,487; each of which is incorporated by reference herein in its entirety.

The reaction components may be introduced to an interior of the loop slurry polymerization reactor 110 via inlets or conduits at specified locations, such as feed line 102. Any combination of the reaction components identified above (and others known to those skilled in the art), together with any catalyst, co-catalyst, or both as described herein, may form a suspension, i.e., a slurry, that circulates through the loop formed by the loop slurry polymerization reactor 110, for example as indicated by flow arrows 117.

The slurry may circulate through the loop slurry polymerization reactor 110, and monomers (and optionally, comonomers) may polymerize to form a polymerization product. The polymerization product may comprise a polymerization product slurry, a product mixture, or combinations thereof.

In embodiments, the polymerization product slurry may comprise solid polymer and a liquid phase of a diluent. In an embodiment, the polymerization product slurry may comprise unreacted monomer, unreacted comonomer, or both in a liquid phase. In additional or alternative embodiments, the polymerization product slurry may generally comprise various solids, semi-solids, volatile and nonvolatile liquids, or combinations thereof. In an embodiment, the polymerization product slurry may comprise one or more of hydrogen, nitrogen, methane, ethylene, ethane, propylene, propane, butane, isobutane, pentane, hexane, 1-hexene and heavier hydrocarbons. In an embodiment, ethylene may be present in a range of from about 0.1 wt. % to about 15 wt. %, alternatively, from about 1.5 wt. % to about 5 wt. %, alternatively, about 2 wt. % to about 4 wt. % by total weight of the liquid in the product line. Ethane may be present in a range of from about 0.001 wt. % to about 4 wt. %, alternatively, from about 0.2 wt. % to about 0.5 wt. % by total weight of the material in the product line. Isobutane may be present in a range from about 80 wt. % to about 98 wt. %, alternatively, from about 92 wt. % to about 96 wt. %, alternatively, about 95 wt. % by total weight of the material in the product line.

In embodiments, the product mixture may comprise the solid polymer and a vapor phase of at least a portion of the diluent. In additional or alternative embodiments, the mixture may comprise unreacted, gaseous monomers or optional comonomers (e.g., unreacted ethylene monomers, unreacted 1-butene monomers), gaseous waste products, gaseous contaminants, or combinations thereof. As used herein, an "unreacted monomer," for example, ethylene, refers to a monomer that was introduced into a polymerization reactor during a polymerization reaction but was not incorporated into a polymer. As used herein, an "unreacted comonomer," for example, 1-butene, refers to a comonomer that was introduced into a polymerization reactor during a polymerization reaction but was not incorporated into a polymer. Such gaseous phase product mixtures may be present when gas phase reactors are used in place of or in addition to a loop slurry reactor.

In embodiments, the solid polymer product may comprise a homopolymer, a copolymer, or combinations thereof. The homopolymer, the polymers of the copolymer, or both may comprise a multimodal (e.g., a bimodal) polymer (e.g., polyethylene). For example, the solid polymer may comprise both a relatively high molecular weight, low density (HMWLD) polyethylene polymer component and a relatively low molecular weight, high density (LMWHD) polyethylene polymer component. Various types of suitable polymers may be characterized as having various densities. For example, a Type I polymer may be characterized as having a density in a range of from about 0.910 g/cm$^3$ to about 0.925 g/cm$^3$; alternatively, a Type II polymer may be characterized as having a density from about 0.926 g/cm$^3$ to about 0.940 g/cm$^3$; alternatively, a Type III polymer may be characterized as having a density from about 0.941 g/cm$^3$ to about 0.959 g/cm$^3$; alternatively, a Type IV polymer may be characterized as having a density of greater than about 0.960 g/cm$^3$. The solid polymer may comprise other polyolefin polymers.

The polymerization product (e.g., polymerization product slurry) may be withdrawn from one or more reactors present in system 100, e.g., the loop slurry polymerization reactor 110, via first line 120. The withdrawn polymerization product may be conveyed through the first line 120 to a separation vessel 140. The line 120 may be referred to as a flashline between reactor 110 and separation vessel 140, wherein a portion, substantially all, or all (e.g., 100%) of liquid phase components present in the polymerization product are converted to gas phase components. The polymerization product may be conveyed to the separation vessel 140. The flash line may comprise a variable inner diameter, which may increase in the direction of flow. In embodiments, the upstream portion of the flash line may have an inner diameter of about 1 inch to about 8 inches, and the downstream portion may have an inner diameter of about 2 inches to about 10 inches.

In an embodiment, a polymerization product slurry in the polymerization product may convert to an at least partial gas phase product mixture in the line 120. Thus, in embodiments, the polymerization product conveyed through line 120 may be in the form of a liquid polymerization product slurry (e.g., a slurry of solid polymer and liquid phase diluent, unreacted monomer/comonomer, or any combination thereof), a gas phase product mixture (e.g., solid polymer and gas phase diluent, unreacted monomer/comonomer, or any combination thereof), or combinations thereof (e.g., a three-phase mixture of liquid and gaseous diluent, unreacted monomer/comonomer, or any combination thereof, and solid polymer), and the form of the polymerization product may be a function of the conditions (e.g., temperature and pressure) present at a given location in line 120.

In an embodiment, polymer product withdrawn from the loop slurry polymerization reactor 110 may be conveyed through the line 120 via the total pressure differential between the operating pressure of the loop slurry polymerization reactor 110 and a pressure in the separation vessel 140. In an embodiment, the polymerization product (e.g., polymerization product slurry, mixture, or combinations thereof) may be conveyed through the line 120, which may comprise a continuous takeoff (CTO) valve, such as takeoff valve 122, to yield an at least partial gas phase mixture (e.g., mixture of gas phase diluent, unreacted monomer/comonomer, or any combination thereof, and solid polymer). The position of the separation vessel 140 relative to the loop slurry polymerization reactor 110 may be adjusted in order to transfer withdrawn polymer product via the total pressure differential, for example, to minimize or reduce the equipment dedicated to polymer product conveyance, to volatilize all liquid in the polymer product, or combinations thereof. In an embodiment, the total pressure differential may be the sole means for conveying polymer product between the loop slurry polymerization reactor 110 and separation vessel 140.

The separation vessel 140 may recover solid polymer which is received from the line 120. In one or more of the embodiments disclosed herein, the polymerization product flowing from the line 120 (for example, a mixture of solid polymer and at least a portion, substantially all or all of the other components, e.g., diluent, unreacted monomer/comonomer, or any combination thereof, are in a gas phase) may be separated in separation vessel 140 into solid polymer in line 144 and one or more gases in line 142.

Any suitable technique may be used to separate the polymerization product into solid polymer and gases. For example, the separation vessel 140 may comprise a vapor-liquid separator. Suitable embodiments of a vapor-liquid separator may include a distillation column, a flash tank, a filter, a membrane, a reactor, an absorbent, an adsorbent, a molecular sieve, a cyclone, or combinations thereof. In an embodiment, the separator comprises a flash tank. Not seeking to be bound by theory, such a flash tank may comprise a vessel configured to vaporize, remove, or vaporize and remove low vapor pressure components from a high temperature fluid, a high pressure fluid, or both.

In an embodiment, the separation vessel 140 may be configured such that polymerization product from the line 120 may be separated into solid and liquid (e.g., a condensate) phase components in line 144 and a gas (e.g., vapor) phase components in line 142. The liquid or condensate may comprise solid polymer (e.g., polyethylene) and any liquid phase components such as diluent, unreacted monomer/comonomer, or both, and in some embodiments line 144 is a concentrated slurry in comparison to the product slurry in line 120. The gas or vapor may comprise volatile solvents, diluent, unreacted monomers optional comonomers, waste gases (e.g., secondary reaction products, such as contaminants and the like), or any combination thereof. The separations vessel 140 may be configured such that the polymerization product flowing from the line 120 is flashed by heat, pressure reduction, or combinations thereof such that the enthalpy of the line is increased. This may be accomplished via a heater, a flashline heater, various other operations commonly known in the art, or combinations thereof. For example, a flash line heater comprising a double pipe may exchange heat by hot water or steam. Such a flashline heater may increase the temperature of the line 120 while reducing its pressure.

In an alternative embodiment, the separation vessel 140 may be configured such that polymerization product from line 120 may be separated into solid polymer in line 144 substantially or completely free of any liquid phase components and one or more gases in line 142. Suitable separation techniques include distilling, vaporizing, flashing, filtering, membrane screening, absorbing, adsorbing, cycloning, gravity settling, or combinations thereof, the polymerization product received in separation vessel 140 from the line 120.

In an embodiment, the separation vessel 140 may operate at a pressure of from about 50 psig (about 0.35 MPa) to about 500 psig (about 3.45 MPa); alternatively, from about 130 psig (about 0.90 MPa) to about 190 psig (about 1.31 MPa); and further alternatively, at an operating pressure of about 135 psig (about 0.93 MPa).

In one or more embodiments, the gas in line 142 may comprise hydrogen, nitrogen, methane, ethylene, ethane, propylene, propane, butane, isobutane, pentane, hexane, 1-hexene and heavier hydrocarbons. In an embodiment, ethylene may be present in a range of from about 0.1 wt. % to about 15 wt. %, alternatively from about 1.5 wt. % to about 5 wt. %, or alternatively, about 2 wt. % to about 4 wt. % by total weight of the line. Ethane may be present in a range of from about 0.001 wt. % to about 4 wt. %, or alternatively from about 0.2 wt. % to about 0.5 wt. % by total weight of the line. Isobutane may be present in a range of from about 80 wt. % to about 98 wt. %, alternatively from about 92 wt. % to about 96 wt. %, or alternatively, about 95 wt. % by total weight of the line.

The separation vessel 140 may additionally comprise any equipment associated with the separation vessel 140, such as control devices (e.g., a PID controller) and measurement instruments (e.g., thermocouples), and level control and measurement devices.

In an embodiment, the slurry may be removed from loop slurry polymerization reactor 110 by the use of one or more settling legs. The settling leg may be an alternative removal device or in addition to the line 120. In this embodiment, a portion of the product slurry can be continuously or periodically drawn off from the reactor loop into a relatively short segment of piping in a generally vertically positioned relative to the loop horizontal line. The product slurry draw may be controlled in rate or amount by a receiver valve and into a sloped or slanted (canted) leg. Once the product slurry, and particularly the solid polymer product, is received in the settling leg, the reactor effluent can be flashed to remove the solid polymer from the liquids (e.g., the diluent, monomer, comonomer, etc.). Various technologies can be used for this separation step including but not limited to, flashing that can include any combination of heat addition and pressure reduction, separation by cyclonic action in either a cyclone or hydrocyclone, or separation by centrifugation. The solid polymer product having a portion, substantially all, or all of the liquid removed can then be passed to one or more downstream processing units.

In an embodiment, at least one motive device, such as pump 150, may circulate the fluid slurry (e.g., reaction mixture slurry) in the loop slurry polymerization reactor 110, wherein a direction of the flow can be according to the flow arrows 117. In some embodiments, two or more motive devices may circulate the fluid slurry in the loop slurry polymerization reactor 110. For purposes of the disclosure herein, the reaction mixture slurry is defined as the contents of the reactor (e.g., loop slurry polymerization reactor 110). Once the reaction mixture slurry is withdrawn from the reactor, the slurry can be referred to as "polymerization product slurry."

Generally, pressure control valves, such as takeoff valves (e.g., takeoff valve 122) can be located at various points along the loop slurry polymerization reactor 110, and such valves can be located either downstream or upstream of the pumps. For purposes of the disclosure herein, the terms "upstream" and "downstream" are defined with respect to each individual device, such as for example a pump, or a valve. Generally, a loop slurry polymerization reactor, such as loop slurry polymerization reactor 110, can be characterized by a linear distance along the reactor length (e.g., an interior distance traveled by the reaction mixture as it circulates through the reactor). For purposes of the disclosure herein, the term "downstream" as it relates to a particular device (e.g., pump, valve, etc.) refers to half of the linear distance of a reactor length, starting at the point where the device (as is the case for a pump) or a line containing the device (as is the case for a valve) contacts the loop slurry polymerization reactor, and in the direction of the flow of the slurry through the loop slurry polymerization reactor. Further, for purposes of the disclosure herein, the term "upstream" as it relates to a particular device (e.g., pump, valve, etc.) refers to half of the linear distance of a reactor length, starting at the point where the device (as is the case for a pump) or a line containing the device (as is the case for a valve) contacts the loop slurry polymerization reactor, and in the direction opposite to the direction of the flow of the slurry through the loop slurry polymerization reactor.

As will be appreciated by one of skill in the art, and with the help of this disclosure, when more than one pump is used for circulating the slurry through the loop slurry polymerization reactor, what is upstream of a first pump can be downstream of a second pump. For example, a takeoff valve can be upstream of a first pump, and downstream of a second pump. Similarly, as will be appreciated by one of skill in the art, and with the help of this disclosure, what is upstream of a valve can be downstream of another valve. For example, a pump can be upstream of a first valve, and downstream of a second valve. As another example, a first valve can be upstream of a second valve, and downstream of a third valve, and at the same time the third valve can be upstream of the first valve, and the second valve can be downstream of the first valve.

In an embodiment, a polymerization process as described herein can comprise detecting a pressure change in the reaction mixture slurry downstream of the pump, wherein a pressure sensor, such as pressure sensor $P_o$ in the embodiment of FIG. 1, can be located downstream of the pump and can detect a local pressure in the reaction mixture slurry downstream of the pump.

In some embodiments, the loop slurry polymerization reactor can comprise multiple pumps, wherein a pressure change in the reaction mixture slurry can be detected downstream of each pump via one or more pressure sensors, such as pressure sensor $P_o$ in the embodiment of FIG. 1. In such embodiment, one or more pressure sensors can be located downstream of each pump and can detect a local pressure in the reaction mixture slurry downstream of each pump. Pressure sensors are generally connected to a pressure controller (which is part of a pressure control system), for example via control lines, wherein the control lines can transmit the pressure information from the pressure sensor to the pressure controller.

In an embodiment, a pressure control system can comprise a pressure controller, wherein the pressure controller can receive signals from the one or more pressure sensors downstream of each pump. The pressure control system can control one or more takeoff valves.

Generally, a takeoff valve 122 allows for removing a portion of the reaction mixture slurry, wherein a portion of the reaction mixture slurry is continually removed from the polymerization reactor (e.g., polymerization reactor 110, 111, 180) in proportion to a takeoff valve position. Takeoff valves 122 can have various positions, to allow for controlling a volumetric flow through the valve, thereby allowing for controlling an amount of material that moves through the valve. Removing a portion of the reaction mixture slurry through a takeoff valve can change a slurry concentration based on the dynamics of the takeoff valve. For example, the takeoff valve nozzle design and location can be designed to take a fluid out of the reactor having a greater polymer concentration and a lower diluent concentration than the average polymer concentration and diluent concentration of the reaction mixture within the polymerization reactor. Thus, the removal of the product stream from the polymerization reactor can reduce a concentration of the polymer in the reaction mixture within the polymerization reactor that is downstream of the takeoff valve.

In an embodiment, a polymerization process as described herein can comprise generating, by a pressure controller 162, a takeoff valve actuation signal for a takeoff valve 122 based on a pressure change (e.g., pressure differential), wherein a portion of the reaction mixture slurry can be continually removed from the polymerization reactor in proportion to the takeoff valve position, and wherein the reaction mixture slurry can be retained in the polymerization reactor when the takeoff valve is in a closed position, wherein the reactor pressure can be controlled by the takeoff valve position.

In an embodiment, the takeoff valve can allow for the removal of a portion of the reaction mixture slurry from the loop slurry polymerization reactor. The removal of a portion of the reaction mixture slurry from the loop slurry polymerization reactor causes a local concentration change in solids (e.g., polymer particles) in the reaction mixture slurry. As will be appreciated by one of skill in the art, and with the help of this disclosure, a design of the takeoff valve (such as a design of a takeoff valve nozzle) controls how the reaction mixture slurry leaves the loop slurry polymerization reactor, in terms of a concentration of solids removed through the valve.

In an embodiment, an average concentration of polymer particles of the reaction mixture slurry can be greater than about 30 wt. %, greater than about 40 wt. %, greater than about 45 wt. %, or greater than about 50 wt. %, based on the total weight of the reaction mixture slurry. As will be appreciated by one of skill in the art, and with the help of this disclosure, the concentration of polymer particles can vary along a length of the loop slurry polymerization reactor, and the average concentration of polymer particles of the reaction mixture slurry accounts for variations in polymer particles concentration in various regions of the loop slurry polymerization reactor, wherein some of the variations can be due to slurry movement (as opposed to a homogeneous solution movement).

In embodiments where the takeoff valve allows for removal of a portion of the reaction mixture slurry from the polymerization reactor (e.g., the takeoff valve is in an open position), the concentration of the polymer particles downstream of the takeoff valve can be less than the average concentration of polymer particles (e.g., an average polymer particle concentration of the reaction mixture slurry).

As will be appreciated by one of skill in the art, and with the help of this disclosure, a change in the local concentration causes a change in the local slurry density. Once the slurry with changed density flows through the loop slurry polymerization reactor past a pump, a differential pressure for the pump changes, and a pump power consumption changes as well. Both the differential pressure and the pump power consumption can vary with the density of the slurry. A change in the differential pressure of the pump can cause a fluctuation in a local pressure immediately downstream of the pump. The pressure controller can receive a signal from the pressure sensor indicating that the pressure downstream of the pump has changed, and the pressure controller 162 can actuate the outlet valves to maintain the pressure in the slurry at a set point value, which can result in a change in the reactor pressure.

In an embodiment, the pressure controller 162 can open the takeoff valve in response to a pressure increase. In another embodiment, the pressure controller can close the takeoff valve in response to a pressure decrease.

When a pressure variation is a decrease in pressure (e.g., a lower pressure), the pressure controller can actuate the takeoff valves towards the closed position, which in turn would cause the pressure sensor located downstream of the next pump that the reaction mixture slurry is flowing past to indicate a higher pressure differential for the pump, owing to a relatively higher concentration of solids (and corresponding higher slurry density). A higher pump pressure differential would lead the pressure control system to actuate the takeoff valves towards the open position, which would cause a lower concentration of solids (and corresponding lower slurry density). This could cause the pressure sensor located downstream of the next pump that the reaction mixture slurry is flowing past to indicate a lower pressure differential for the pump.

During use of the polymerization reactor, a cyclic pressure cycle can then develop. When the pressure controller actuates the takeoff valve or valves towards an open position, the slurry density may decrease at or near the takeoff valves. When the lower density slurry flows through the loop to the pump, the lower slurry density may result in a pressure decrease across the pump, which can be detected in the loop by the pressure sensor. In response, the pressure controller can move the takeoff valve or valves towards the closed position, which may increase the slurry density at or near the takeoff valve or valves. When the higher density slurry flows through the loop to the pump, the higher slurry density may result in a pressure increase across the pump, which can be detected in the loop by the pressure sensor. The pressure controller may then repeat the cycle and actuate the takeoff valve or valves towards the open position. As such, an initial disturbance in a pump pressure differential can be amplified and propagated in a rhythmic fashion, with a corresponding disturbance in pump power. The rhythmic variation in pump pressure differential and pump power is generally related to an amount of time that it takes the reaction mixture slurry to flow from a takeoff valve to the next pump. For example, the increase in slurry density at or near the takeoff valve may have a delayed effect on the slurry pressure during the time the increased density slurry flows from the takeoff valve to the pump. This delay can be taken into account in a corresponding control scheme as described herein to reduce the pressure fluctuations in the reactor.

Figure 3:
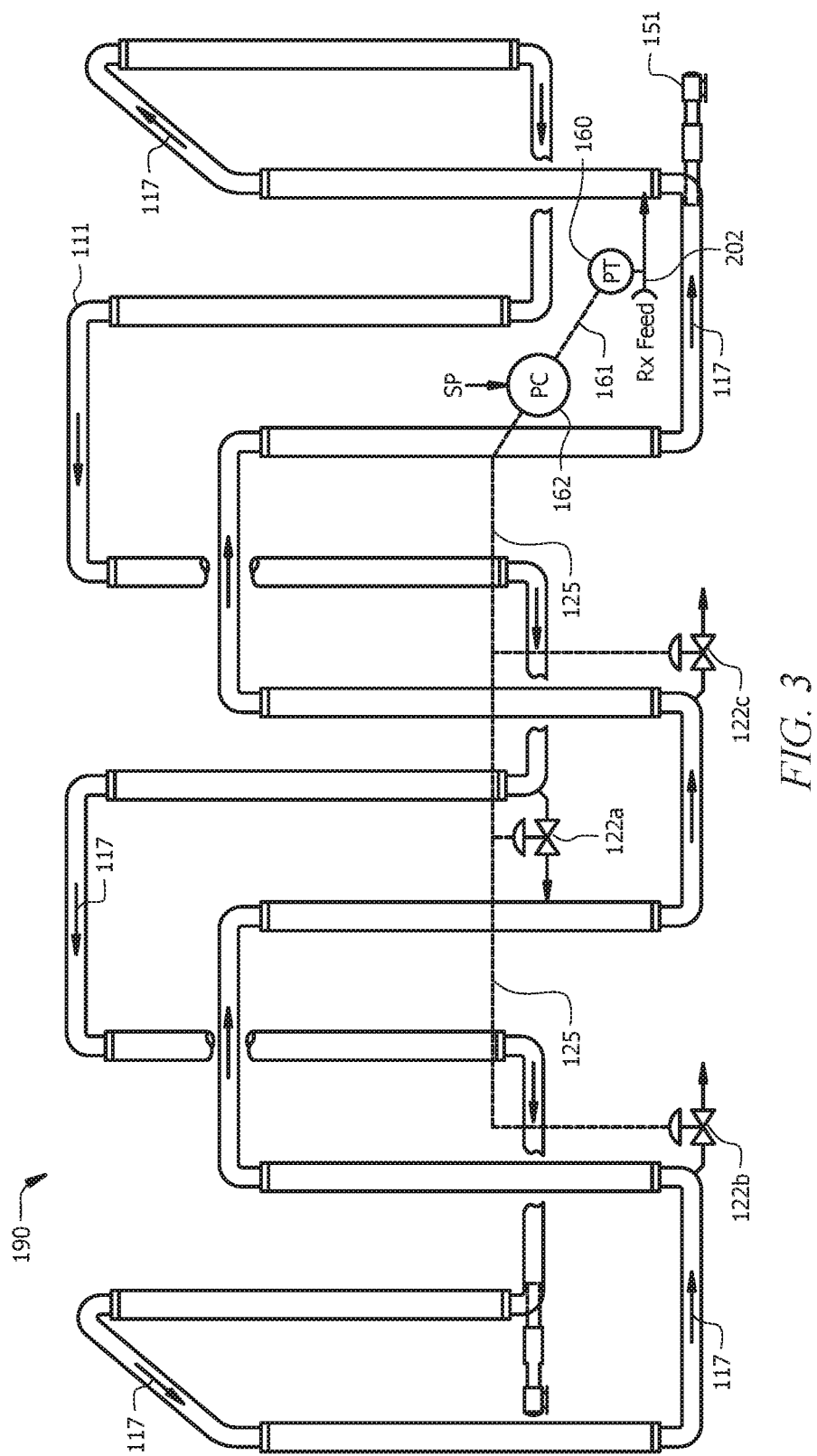
FIG. 3 schematically illustrates yet another process flow diagram of an embodiment of a loop polymerization process.

In an embodiment, a pressure control system can be used to control the pressure fluctuations in the reactor. An example of a polymerization system having a pressure control system to reduce pressure fluctuations is shown in FIG. 3, which illustrates a schematic process flow diagram of an embodiment of a polymerization system 190. The polymerization product can be produced in loop slurry polymerization reactor 111, which can be the same or similar to the loop slurry polymerization reactor 110 or 180 described with respect to FIG. 1 or FIG. 2. At least one motive device, such as pump 151, may circulate the fluid slurry (e.g., reaction mixture slurry) in the loop slurry polymerization reactor 111, where a direction of the flow can be according to the flow arrows 117. The polymerization system 190 can comprise one or more takeoff valves such as a first takeoff valve 122a, a second takeoff valve 122b, and/or a third takeoff valve 122c. A pressure sensor 160 can measure the pressure in the reaction mixture slurry downstream of the pump 151. The pressure sensor 160 can comprise, in some aspects, a pressure transmitter such that the pressure sensor 160 is in communication with a pressure controller 162 via a control line 161. The pressure controller is in signal communication with the one or more takeoff valves such as the first takeoff valve 122a, the second takeoff valve 122b, and the third takeoff valve 122c, via control lines 125.

The pressure controller 162 generally serves to detect a pressure of the slurry at one or more locations in the polymerization reactor 111, and generate an actuation signal (e.g., a control signal) to actuate one or more of the takeoff valves such as a first takeoff valve 122a, a second takeoff valve 122b, and a third takeoff valve 122c. The actuation signal can be configured to maintain the pressure within the slurry at a set point value. The pressure controller 162 can be implemented using a programmable logic controller (PLC), which can be implemented using a standalone device, operate as an application executing on a processor, or both.

The pressure sensor 160 can comprise any suitable pressure sensors, and the pressure sensor 160 can be placed at any of the locations described herein, including within the inlet feed line 202, within the polymerization reactor 111, or at any other suitable location. The pressure sensor 160 can generate an output signal in response to detecting the pressure within the slurry. The output signal can comprise any suitable signals such as electrical signals, pneumatic signals, mechanical signals, or the like. The pressure controller 162 can then use the signals to determine the pressure of the slurry at the location of the pressure sensor 160.

In an embodiment, the pressure controller 162 can be configured to determine an appropriate output signal to actuate one or more of the takeoff valves such as a first takeoff valve 122a, a second takeoff valve 122b, and/or a third takeoff valve 122c. For clarity, the use of an actuation signal for a single takeoff valve 122c will be described initially, although the use of such actuation signal may be applied to any or all of the takeoff valves associated with the polymerization reactor. As described above, when the pressure controller 162 detects a pressure of the slurry above a set point, the pressure controller 162 can generate an actuation signal to move the takeoff valve 122c towards an open position. The actuation signal may open the takeoff valve 122c towards the open position to increase the amount of slurry being taken out of the polymerization reactor 111, but does not necessarily fully open the takeoff valve 122c. For example, the actuation signal may move the takeoff valve 122c towards the open position by a percentage of the fully open amount that is configured to decrease the pressure in the slurry to the desired set point pressure.

Similarly, when the pressure controller 162 detects a pressure of the slurry below a set point, the pressure controller 162 can generate an actuation signal to move the takeoff valve 122c towards a closed position. The actuation signal may close the takeoff valve 122c towards the closed position to decrease the amount of slurry being taken out of the polymerization reactor 111, but does not necessarily fully close the takeoff valve 122c. For example, the actuation signal may move the takeoff valve 122c towards the closed position by a percentage of the fully open amount (were the fully closed amount would be equivalent to a zero percentage open) that is configured to increase the pressure in the slurry to the set point.

As also noted herein, the pressure change results from a density change in the slurry passing through the pump 151, which may operate based on an operating curve or power equation. In an embodiment, an exemplary power equation can be expressed as follows:

$$P = Q*H*\rho/\mu*C \qquad (Eq.\ 1)$$

Where: P is power; Q is the volumetric flow rate in gallons per minute; H is the fluid head (e.g., the change in fluid head pressure, dP) in pounds per square inch; $\rho$ is the fluid density in $lb/ft^3$; $\mu$ is the pump efficiency in percentage (%) as determined by the particular pump design, and C is a units conversion factor. As shown in this equation, the flow rate and fluid head have a limited change when the density of the reaction mixture flowing through an axial pump changes.

The resulting pressure change therefore occurs at a time that is delayed from the actuation time by an amount of time between the time the takeoff valve 122c is actuated and the time the resulting density change in the slurry reaches the pump 151. This delayed reaction time can be calculated based on the flow rate of the slurry passing through polymerization reactor 111. For example, a total length traveled by the slurry between the takeoff valve 122c and the pump 151 divided by the slurry velocity will provide the approximate delayed reaction time that the pressure change occurs within the slurry downstream of the pump 151.

With continued reference to FIG. 3, in order to take the density changes and the resulting pressure changes into account in the control system, a correction to the actuation signal sent to the takeoff valve 122c, and in some embodiments, a time delay, can be applied to the corrected actuation signal to account for the difference between the time the takeoff valve 122c is actuated and the time the slurry reaches the downstream pump 151. The correction to the actuation signal can generally be used to anticipate the expected pressure variation due to the interaction of the change in the slurry density and the pump. By anticipating and correcting for the predicted pressure change, the cyclic variations in pressure and pump power can be dampened or canceled while effectively maintaining the pressure within the slurry at or near the set point. In an embodiment, the use of the correction to the takeoff valve actuation signal can reduce a power fluctuation of the pump 151 when compared to adjusting the position of the takeoff valve 122c without applying the correction.

In an embodiment, the correction can be applied to dampen the actuation signal provided from the pressure controller 162 to a takeoff valve such as takeoff valve 122c. For example, when the takeoff valve 122c is actuated towards a closed position, the slurry density may increase. When the slurry with the increased density reaches the pump 151, the pump power consumption may increase and the pressure in the slurry may also increase. The pressure controller 162 may then generate an actuation signal to move the takeoff valve 122c towards an open position. The correction can be applied to reduce the magnitude of the actuation signal to move the takeoff valve 122c towards the open position. Similarly, any decrease in pressure due to, for example, actuation of the takeoff valve 122c towards an open position, may result in the pressure controller generating an actuation signal to move the takeoff valve 122c towards the closed position. The correction can be applied to the actuation signal to reduce the amount by which the takeoff valve 122c moves towards the closed position. The resulting application of the correction can then dampen the resulting change in pressure within the polymerization reactor 111.

The value or magnitude of the correction can be determined using various criteria. In an embodiment, the value or magnitude of the correction can be based on a change in the pump power of the pump relative to a time average of the pump power. For example, the pump power can be averaged over a time period corresponding to between about 1 and 10 circulation periods or between about 2 and 5 circulation periods of the slurry around the complete reactor loop within the polymerization reactor. For purposes of the disclosure herein, a circulation period refers to the amount of time it takes a portion (e.g., a plug) of reaction mixture slurry to travel the entire length of the loop slurry polymerization reactor, wherein it is assumed that none of the portion (e.g., a plug) of reaction mixture slurry is removed from the reactor. The variance of the pump power in response to each takeoff valve 122c actuation relative to the time average can then be used to determine the pump power variance. For example, the pump power variance can be calculated by subtracting the time average pump power or pressure reading from a current reading, where the current reading represents an instantaneous or time averaged reading over a short period of time (e.g., over a time corresponding to about 1% to about 20% of a circulation period).

The pump power variance can be correlated with a percentage of the total signal range of the takeoff valve actuation signal generated by the pressure controller. This correlation can be determined using known or historical data for the polymerization reactor 111 and may vary depending on the specific type of pump used, the nature of the actuation signals, the type of control takeoff valves used, and the like. When the correction is represented as a percentage of the total signal range of the takeoff valve actuation signal generated by the pressure controller 162, the correction factor can be in a range of about 0.05% to about 2%, between about 0.1% to about 1%, between about 0.2% and about 0.9%, or between about 0.25% and about 0.75%, of a signal range of the takeoff valve actuation signal.

The correction may have an upper threshold and the pressure controller 162 may be configured to prevent a correction over the upper threshold from being applied to the actuation signal. The use of the upper threshold may be useful to allow the pressure controller 162 and the associated takeoff valves 122a, 122b, 122c to operate as needed during startup, shut down, in the event of an upset, in emergency situations, or any combination thereof. In an embodiment, the upper threshold may be between about 0.5% and about 2% of the signal range of the takeoff valve actuation signal.

The correction can be applied to the actuation signal until a new correction is calculated based on changed inputs to the pressure controller 162. In some embodiments, the pressure, the power, or both can be continually or periodically monitored and the variance from the average pressure, the average power, or both can be recalculated based on updated measurement values. The magnitude of the correction can be updated with the changes in the pressure, the changes in the pump power, or both and applied to the actuation signal. In some embodiments, the application of the correction factor to the actuation signal can be delayed in time, as described in more detail herein.

In some embodiments, the pressure controller 162 can be configured to apply a tuning factor to the correction to further tune the variations in the pump power consumption. The tuning factor can be used to reduce the likelihood that the correction can cause additional system effects within the polymerization reactor. The tuning factor may also allow the correction to more slowly dampen out the variations. In an embodiment, the tuning factor may be a factor between about 0.01 and about 0.7, between about 0.01 and about 0.5, between about 0.05 and about 0.45, or between about 0.1 and about 0.4. The tuning factor can be directly applied to the correction factor to reduce the magnitude of the correction factor applied to the actuation signal generated by the pressure controller 162.

In some embodiments, a time delay can be applied to the correction generated by the pressure controller 162 to delay the time at which the correction is applied to the actuation signal. The time delay used for application of the correction signal can be based on the amount of time that the slurry takes to flow from the pump 151 through the polymerization reactor 111 to the takeoff valve 122c. The time delay can be calculated by multiplying the total circulation time for the slurry to traverse through the polymerization reactor 111 one time by a ratio of the flowpath distance from the pump 151 to the takeoff valve 122c. The application of the correction at the time delay allows the correction to be applied at a time to correct for the cyclic variance in pressure, pump power, or both.

The pressure controller 162 can be configured to continually provide the actuation signal based on the updated pressure, the pump power measurements, or both. The pressure controller 162 may continue to output an actuation signal to the takeoff valve 122c based on the updated measurements. During this process, the pressure controller 162 may also continuously or periodically update the correction signal. However, the correction signal may not be applied at the time that it is determined by the pressure controller 162. Rather, the time delay can be applied to the correction signal so that the correction signal determined at a first time based on the measurements for the first time is not applied until a second time. The second time can be the first time with the time delay added. The correction, and any optional tuning factor, can be applied at the second time to the actuation signal generated by the pressure controller 162 at the second time, where the actuation signal generated at the second time may be based on pressure, pump power readings, or both occurring at the second time. The delay in applying the correction factor to the actuation signal may then correct the actuation signal to dampen any variations in the pressure, the pump power consumption, or both.

The polymerization reactor 111 can be used with the pressure controller 162 and associated sensors and takeoff valves, for example, takeoff valve 122c, to carry out a polymerization process. The polymerization process can be carried out using any of the reactor configurations described herein. In an embodiment, the polymerization process can include circulating the reaction mixture slurry in the polymerization loop reactor using the polymerization process. The reaction mixture slurry can be circulated using a motive device such as a pump 151. The reaction mixture slurry can comprise an olefin, a catalyst, and polymer particles that are the product of the polymerization reaction.

As the reaction mixture slurry circulates through the polymerization loop reactor, a pressure change can be detected in the reaction mixture slurry downstream of the pump 151. As described herein, the pressure change can be detected by a pressure sensor 160 and relayed to a pressure controller 162. The pressure controller 162 can then generate an actuation signal to adjust a position of one or more takeoff valves 122a, 122b, 122c to control the pressure within the polymerization loop reactor in an effort to maintain a set point pressure. Due to the design of the takeoff valve 122c, the fluid in the polymerization reaction mixture downstream of the takeoff valve 122c within the polymerization loop reactor may be have a concentration of polymer particles in the reaction mixture slurry that is less than an average concentration of polymer particles in the polymerization reactor. Similarly, the concentration of the polymer particles in an outlet line downstream of the takeoff valve(s) can be enriched relative to an average concentration of polymer particles in the polymerization reactor In general, an actuation signal configured to move a takeoff valve such as takeoff valve 122c towards a closed position may increase the pressure in the polymerization loop reactor, while an actuation signal configured to move the takeoff valve 122c towards an open position may decrease the pressure in the polymerization loop reactor. Thus, any adjustments to the takeoff valve position can result in a change of the pressure within the polymerization loop reactor based on how the takeoff valve 122c is adjusted. In an embodiment, the pressure controller can generate a correction to the takeoff valve actuation signal. A magnitude of the correction can be based on a change in a pump power of the pump relative to a time average of the pump power, where the time average of the pump power can be an average pump power over a time one or more circulation periods of the reaction mixture slurry through the polymerization loop reactor. The correction to the takeoff valve actuation signal can aid in reducing any pump power fluctuations and maintain the pump power at a more steady level closer to the time average of the pump power.

The correction can then be applied to the actuation signal generated by the pressure controller 162 for the takeoff valve 122c. In an embodiment, applying the correction to the takeoff valve actuation signal can reduce a pump power fluctuation of the pump when compared to adjusting the position of the takeoff valve using the takeoff valve actuation signal without applying the correction (which would propagate pump power fluctuations in a rhythmic fashion, as previously described herein). In some embodiments, the polymerization process can also include creating a tuning factor and applying the tuning factor to the correction prior to applying the correction to the takeoff valve actuation signal. Generally, the tuning factor would reduce the magnitude of the correction in order to prevent an overcorrection, which in turn could induce instabilities into the system. For example, the application of the correction could result in a feedback mechanism that can propagate rhythmic power fluctuations through the system, as previously described herein.

In an embodiment, the polymerization process can also include generating a time delay for the correction. The time delay can be based on a time for the reaction mixture slurry to flow from the pump or other motive device to the takeoff valve 122c that caused a pressure change. The correction can be applied to the takeoff valve actuation signal, where the correction is applied after a time delay to provide a corrected takeoff valve actuation signal. The corrected takeoff valve actuation signal can then be sent to the takeoff valve 122c, where the corrected takeoff valve actuation signal is sent to the takeoff valve after the time delay. In some embodiments, the corrected takeoff valve actuation signal represent the takeoff valve actuation signal being output from the pressure controller having the correction applied after the time delay so that the corrected takeoff valve actuation signal is only being sent after the time delay, as described in more detail herein.

In an embodiment, the position of the takeoff valve can then be adjusted in response to providing the corrected takeoff valve actuation signal after the time delay. This adjustment can take into account the takeoff valve actuation signal from the pressure controller that is generated based on present data along with the correction being applied based on past data that has aged by the time delay. When the takeoff valve actuation signal causes the takeoff valve to move towards the open position, the correction can reduce an amount to which the takeoff valve moves towards the open position. Similarly, when the takeoff valve actuation signal can cause the takeoff valve to move towards the closed position, the correction can reduce an amount to which the takeoff valve moves towards the closed position.

In an embodiment, a polymerization system can comprise any suitable number of pumps and any suitable number of takeoff valves. While the present disclosure is discussed in detail in the context of one pump and one or two takeoff valves in a polymerization system, it should be understood by one of skill in the art, and with the help of this disclosure, that any suitable number of pumps and any suitable number of takeoff valves can be employed in a polymerization system. For example, a polymerization system can employ one, two, three, four, five, six, or more pumps. Further, for example, a polymerization system can employ one, two, three, four, five, six, seven, eight, nine, ten, or more takeoff valves.

The polymerization system can comprise a pressure control system having a pressure controller that is configured to accept multiple pressure sensor inputs and generate multiple takeoff valve actuation signals. As will be appreciated by one of skill in the art, and with the help of this disclosure, the pressure control can be configured in a similar manner as described herein, regardless of the number of pumps and takeoff valves employed, with the main difference being that the signals and time delays can change for each individual takeoff valve.

In an embodiment, a polymerization system can comprise a pump and two or more takeoff valves, e.g., a first takeoff valve and a second takeoff valve. As will be appreciated by one of skill in the art, and with the help of this disclosure, any description of the polymerization system comprising a pump and a takeoff valve can be applied without limitation to a polymerization system comprising one or more pumps and two or more takeoff valves. In such an embodiment, a pressure sensor may be associated with each pump, for example, being located downstream of each pump. As will be appreciated by one of skill in the art, and with the help of this disclosure, the polymerization system may not use a one-to-one correspondence between the pumps and the takeoff valves. For example, sometimes multiple takeoff valves can be employed per pump, e.g., a polymerization system can comprise more takeoff valves than pumps. In some embodiments, more pumps may be used with the polymerization process than the number of takeoff valves.

When a plurality of takeoff valves 122a, 122b, 122c are present, the pressure controller 162 can be configured to generate and send actuation signals to each of the plurality of takeoff valves 122a, 122b, 122c. The takeoff valve actuation signals can be the same or different. In an embodiment, the actuation signals may be configured to move each takeoff valve 122a, 122b, 122c towards the same open or closed position by the same amount. In some embodiments, the actuation signals can be different for each takeoff valve 122a, 122b, 122c according to the pressure controller logic as the pressure controller 162 attempts to maintain the pressure within the polymerization reactor at the set point. For example, when a pressure change is detected by the pressure sensor 160, the pressure controller 162 can generate a first actuation signal for the first takeoff valve 122a, a second actuation signal for the second takeoff valve 122b, a third actuation signal for the third takeoff valve 122c, or any combination thereof.

In order to reduce any pressure fluctuations, pump power fluctuations, or both in the polymerization reactor, the pressure controller 162 can generate a correction for each actuation signal for each takeoff valve 122a, 122b, 122c. Each correction can be generated as described above with respect to the generation of a correction for a single takeoff valve actuation signal. In an embodiment, the pressure controller 162 can generate a first correction for the first actuation signal sent to the first takeoff valve 122a, a second correction for the second actuation signal sent to the second takeoff valve 122a, and a third correction for the third actuation signal sent to the third takeoff valve 122a. Each correction can be based on a variation of the pressure, the pump power, or both from a time averaged pressure, a time averaged pump power, or both.

In an embodiment, the correction can be applied to dampen each actuation signal provided from the pressure controller 162 to each takeoff valve 122a, 122b, 122c. When each signal is provided to each respective takeoff valve 122a, 122b, 122c, the resulting impact on the slurry density can be based on the relative time of the actuation and distance to the pump 151. The correction can be applied to reduce the magnitude of each actuation signal to move the respective takeoff valve 122a, 122b, 122c towards the open or closed position, as described with respect to each individual takeoff valve above. The resulting application of the correction can then dampen the resulting change in pressure within the polymerization reactor 111.

The value or magnitude of the correction for each individual takeoff valve actuation signal can be determined using any of the criteria described herein with respect to the correction for a single takeoff valve control signal. As also described herein, the correction for each takeoff valve actuation signal may have an upper threshold and the pressure controller 162 may be configured to prevent a correction over the upper threshold from being applied to the actuation signal. The threshold for each correction for each respective takeoff valve actuation signal can be the same or different, and the threshold can have any of the values described herein.

In some embodiments, the pressure controller 162 can be configured to apply a tuning factor to each correction to each takeoff valve actuation signal. When one or more tuning factors are applied to the corrections, the tuning factors can be the same or different. In some embodiments, the tuning factor for each correction can be different to account for difference in the overall polymerization process such that the tuning factor can be used to adjust the effects of each correction. Each tuning factor that is applied to the correction or corrections can have any of the values described herein.

When multiple takeoff valves 122a, 122b, 122c are present, the time delay can be individually calculated for each takeoff valve 122a, 122b, 122c. The first time delay for the first takeoff valve 122a can be based on the amount of time that the slurry takes to flow from the pump 151 through the polymerization reactor 111 to the first takeoff valve 122a. The second time delay for the second takeoff valve 122b can be based on the amount of time that the slurry takes to flow from the pump 151 through the polymerization reactor 111 to the second takeoff valve 122b. The third time delay for the third takeoff valve 122c can be based on the amount of time that the slurry takes to flow from the pump 151 through the polymerization reactor 111 to the third takeoff valve 122c. The application of each respective correction can then occur at the respective time delay corresponding to each takeoff valve.

The pressure controller 162 can be configured to continually provide the actuation signals to each takeoff valve 122a, 122b, 122c based on the updated pressure measurement, the updated pump power measurement, or both. The pressure controller 162 may continue to output an actuation signal to each takeoff valve 122a, 122b, 122c based on the updated measurements. During this process, the pressure controller 162 may also continuously or periodically update the correction for each takeoff valve actuation signal. However, the corrections may not be applied at the time that it is determined by the pressure controller 162. Rather, each respective time delay can be applied to each correction signal so that the correction signals determined at a first time based on the measurements for the first time is not applied until a corresponding later time that will vary based on the respective time delay for each takeoff valve 122a, 122b, 122c. The later time for each takeoff valve 122a, 122b, 122c can be the first time with each respective time delay added. The correction, and any optional tuning factor, can be applied at the later time to each takeoff valve actuation signal generated by the pressure controller 162 at the later time, where the respective actuation signal is generated at the later time based on pressure readings, pump power readings, or both occurring at the later time. The delay in applying the corresponding correction factor to each takeoff valve actuation signal may then correct the takeoff valve actuation signal to dampen any variations in the pressure, the pump power consumption, or both.

The system can also operate when a plurality of pumps are present. In such an embodiment, the pressure controller can determine a correction, a tuning factor, a time delay, or any combination thereof for each pump and one or more of the takeoff valves. For example, the pressure controller can determine a takeoff control valve actuation signal, a correction, a time delay, or any combination thereof for each pump and the immediately upstream takeoff valve, or for each takeoff valve between the pump and the next upstream pump. In some embodiments, the pressure controller can determine a takeoff valve actuation signal, a correction, a time delay, or any combination thereof for a plurality (including all) takeoff valves based on a plurality of pumps and pressure sensors. The resulting corrections and time delays can be applied to each takeoff valve actuation signal that can change based on any updates to any of the pressure sensors.

In an embodiment, a polymerization process comprising the pressure controller as described herein can be carried out when one or more pumps and one or more takeoff valves are present. In the polymerization process, a reaction mixture slurry can be circulated in a polymerization loop reactor during a polymerization process. The reaction mixture slurry can comprise any of the components described herein such as an olefin, a catalyst, and a polymer product. In an embodiment, the polymerization loop reactor can comprise at least one pump that can be disposed in-line in the polymerization loop reactor. The process will initially be described with respect to a single pump. One or more pressure sensors can be disposed downstream of the pump. One or more takeoff valves such as a first takeoff valve and a second takeoff valve can be disposed downstream of the pump. In this embodiment, the second takeoff valve can be disposed downstream of the first takeoff valve.

The polymerization process may operate to produce a polymer product. During operation, one or more conditions may change that can create a pressure change in the reaction mixture slurry in the polymerization reactor. In an embodiment, the pressure change can be detected in the reaction mixture slurry at the pressure sensor (e.g., at a first pressure sensor, a second pressure sensor, etc.), and the pressure sensor can transmit the signal to the pressure controller of the pressure control system. The pressure controller can generate a first takeoff valve actuation signal for the first takeoff valve and a second takeoff valve actuation signal for the second takeoff valve based on the pressure change. The pressure controller can then send the takeoff valve actuation signals to the first takeoff valve and the second takeoff valve.

The pressure controller can then generate a first correction to the first takeoff valve actuation signal. In some embodiment, the magnitude of the first correction can be based on a change in a pump power of the pump relative to a time average of the pump power, and the value of the correction can include any of the values described herein. In some embodiments, the first correction can be applied to the takeoff valve actuation signal for the first takeoff valve at the time the correction is determined. In other embodiments, the correction may be applied after a time delay, as described in more detail herein.

The pressure controller can then generate a second correction to the second takeoff valve actuation signal. In some embodiment, the magnitude of the second correction can be based on a change in a pump power of the pump relative to a time average of the pump power, and the value of the second correction can include any of the values described herein. In some embodiments, the second correction can be applied to the takeoff valve actuation signal for the second takeoff valve at the time the correction is determined. In other embodiments, the correction may be applied after a time delay, as described in more detail herein.

An optional tuning factor can be applied to either or both takeoff valve actuation signals, and the tuning factor for the first takeoff valve actuation signal can be the same or different than the tuning factor for the second takeoff valve actuation signal. In some embodiments, the pressure controller can generate a first time delay for the first correction. The first time delay can be based on a distance between the pump and the first takeoff control valve (e.g., a time it takes for the reaction mixture slurry to flow from the pump to the first takeoff valve in the polymerization reactor). The first correction can be applied to the first takeoff valve actuation signal after the first time delay to generate a first corrected takeoff valve actuation signal. The correction applied after the time delay can be applied to the takeoff valve actuation signal for the first takeoff valve that is based on the present readings. The corrected takeoff valve actuation signal can then be sent to the first takeoff valve to adjust the position of the first takeoff valve.

In some embodiments, the pressure controller can generate a second time delay for the second correction. The second time delay can be based on a distance between the pump and the second takeoff control valve (e.g., a time it takes for the reaction mixture slurry to flow from the pump to the second takeoff valve in the polymerization reactor). The second correction can be applied to the second takeoff valve actuation signal after the second time delay to generate a second corrected takeoff valve actuation signal. The correction applied after the time delay can be applied to the takeoff valve actuation signal for the second takeoff valve that is based on the present readings. The corrected takeoff valve actuation signal can then be sent to the second takeoff valve to adjust the position of the second takeoff valve.

In response to the adjustments to the first takeoff valve, the second takeoff valve, or both, a portion of the reaction mixture slurry can be removed from the polymerization loop reactor via the first takeoff valve, the second takeoff valve, or both. When the portion of the reaction mixture slurry is removed from the polymerization loop reactor, the concentration of polymer particles in the portion of the reaction mixture slurry removed from the reactor may be higher than an average concentration of polymer particles in the reaction mixture slurry within the polymerization loop reactor. This result may be due to the design of the takeoff valve, which can be configured to increase the concentration of the polymer particles in the fluid removed from the polymerization loop reactor while retaining the remaining components within the reactor. The resulting removal of the portion of the reaction mixture slurry may result in a decrease in the concentration of the polymer particles in the polymerization loop reactor downstream of the takeoff valve. This change in the reaction mixture slurry properties may then result in a pressure decrease as the reaction mixture slurry reaches the pump. The application of the corrections and time delays may then help to reduce any variations in the pressure, the pump power, or both due to the concentration changes at one or more of the takeoff valves.

In an embodiment, a polymerization process as disclosed incorporates a probability network, such as a Bayesian network, to provide improved feedback and control of the polymerization process. For purposes of the disclosure herein, the term "Bayesian network" can be used to refer to a probabilistic graphical model that represents a set of variables and their probabilistic interdependencies. For example, a Bayesian network can represent a probabilistic relationship, and can exhibit one or more of the following aspects: an often subjective nature of input information; a reliance on conditioning (e.g., Bayes's conditioning) as the basis for updating information; the distinction between causal and evidential modes of reasoning, and the like. In some aspects, Bayesian networks can be represented as Bayesian graphic models, such as directed acyclic graphs whose nodes represent variables, and whose arcs encode conditional interdependencies between the variables. Nodes can represent any kind of variable, including a measured parameter (e.g., pressure), a hypothesis, a random variable, or any other suitable variable. Typically, efficient algorithms exist that perform inference and learning in Bayesian networks. Bayesian networks that model sequences of variables can be referred to as dynamic Bayesian networks. Generalizations of Bayesian networks that can represent and solve decision problems under uncertainty can be referred to as influence diagrams. In some aspects, integrating data-driven modeling and knowledge into a self-improving reasoning tool can be used to solve complex Bayesian networks derived directly from data. The structure of the networks can be defined by feeding training data through a data-driven model.

Bayesian networks are generally based on Bayes' theorem, which is an efficient mathematical framework for calculating probabilities according to Bayesian probability. Bayes' theorem can be stated in a simplified form as:

$$P(A|B)=P(B|A)P(A)/P(B),$$

which means: the conditional probability P of event A, given event B, is equal to the conditional probability P of event B, given event A, times the prior probability P of event A, normalized by the prior probability P of event B.

Bayes' theorem could be used in data analysis to differentiate between true positives and false positives. Bayes' theorem could become part of a process control algorithm to diminish the effect of noise in the data, and to keep a control system from over-compensating based on a false positive. False positives generally arise from a strong correlation but with no real cause or effect.

Bayes' theorem generally deals with sequential events, whereby new additional information is obtained for a subsequent event, and that new information can be used to revise the probability of the initial event. In this context, the terms prior probability and posterior probability are commonly used. A prior probability is an initial probability value originally obtained before any additional information is obtained. A posterior probability is a probability value that has been revised by using additional information that is later obtained.

Bayesian networks could be used for feedback control loops monitoring and diagnosis. Generally, a typical control loop can consist of several components including a sensor (e.g., pressure sensor), an actuator (e.g., valve actuator, takeoff valve, etc.), a controller (e.g., pressure controller) and control system (e.g., pressure control system), wherein each component can be subject to possible performance degradation or fault. Any problem in one of these four components can affect control loop performance. Each component can have its monitoring algorithms to monitor the problems and these algorithms may all be affected by one or more of the components. A simple network representing such a control loop can have eight nodes, representing the components and a corresponding number of monitors, and their relations can be described by conditional probabilities. To completely determine the relation among all nodes, it is important to know the joint probabilities of eight random variables. With increased components to be considered and monitors to be added, the complexity of the network can quickly go beyond computational possibility. Bayesian graphic models can rely on the independence of random variable networks, and could provide a solution for the network complexity.

Generally, the building block of a Bayesian network model can be a network of nodes connected by conditional probabilities. These nodes are random variables, which can be continuous, discrete or even binary. For example, for the simplest binary random variables, if there are n binary random variables, the complete distribution is specified by $2^n-1$ joint probabilities. However, by exploring the relationship of each node with the other nodes through Bayesian networks, the number of probabilities that has to be calculated can be reduced dramatically, exploiting the conditional independence between certain variables (i.e., no arcs between certain variables). Bayesian networks can incorporate a priori process knowledge so that the conditional dependence/independence between certain variables is fully utilized, thereby reducing the number of probabilities that have to be calculated. For large numbers of nodes, the saving of computations is huge, making it possible to apply Bayesian inference theory in practice.

For example, Bayesian networks can apply Bayesian inference to diagnose sensor problems (e.g., pressure sensor problems), such as false positive readings. A Bayesian model for sensor fault diagnosis can consider change of gain, change of input signal, sensor bias, and change of variance in the measurement disturbance (varying variance).

Sensor reading for diagnosis can be modeled by general equation: y=Ku+f+e, wherein y is the sensor reading; wherein process gain K can take two values: 1 and 0 corresponding to normal (true positive reading) and abnormal (false positive reading) operation, respectively; input u can take three different values −1, 0, and 1; wherein sensor bias f can take two values: 0 and 1 corresponding to bias and non-bias, respectively; and wherein noise, e, can have a distribution according to the following general equation:

$$e \sim N(0; \sigma^2),$$

wherein variance $\sigma^2$ can also take two values: 1 and 2 representing normal (true positive) and abnormal (false positive) sensor noise, respectively. A graph of the Bayesian model can be built using any appropriate software system suitable for working with Bayesian belief networks and influence diagrams, wherein a node originating an arc can be referred to as a "parent node," and a node where an arc terminates can be referred to as a "child node." A node without parents can also be referred to as a root node.

Diagnosis of sensor problems process can be triggered by sensor readings, which can then then be analyzed with prior probability (unconditional probability) of each root nodes, together with conditional probability distributions of each child nodes. The prior probability of each root node can be determined from equipment performance (e.g., tendency to fault, tendency to give a false positive) or simply from historical data. The conditional probability distribution (the sensor reading node) can be built according to the equation $e \sim N(0; \sigma^2)$, as described above. A process node can be a function node, meaning that it is a function of its parent nodes only (e.g., process gain and process input), and completely determined by its parents. Following a structured chain rule, the joint distribution among remaining random variables, for example sensor bias, process input, process gain, noise variance, noise, and sensor reading, can be established. Through Bayes theorem, probabilistic inferences can be made, for example by using any suitable software package.

In an embodiment, a polymerization process as disclosed herein can utilize Bayes' theorem (Bayesian networks) for data analysis to differentiate between true positives and false positives, wherein the data can be pressure, pump power, melt index, density, molecular weight, flow rates, concentration of components in the reaction mixture slurry, or any other suitable data collected for the polymerization process. The Bayesian network model can identify parameters associated with an input, and even more so potentially false positive correlations (i.e., factors that are not correlated with an input). For example, pump power can be controlled by identifying elements that are not tied to the fluctuations in the pumping power.

Figure 4:
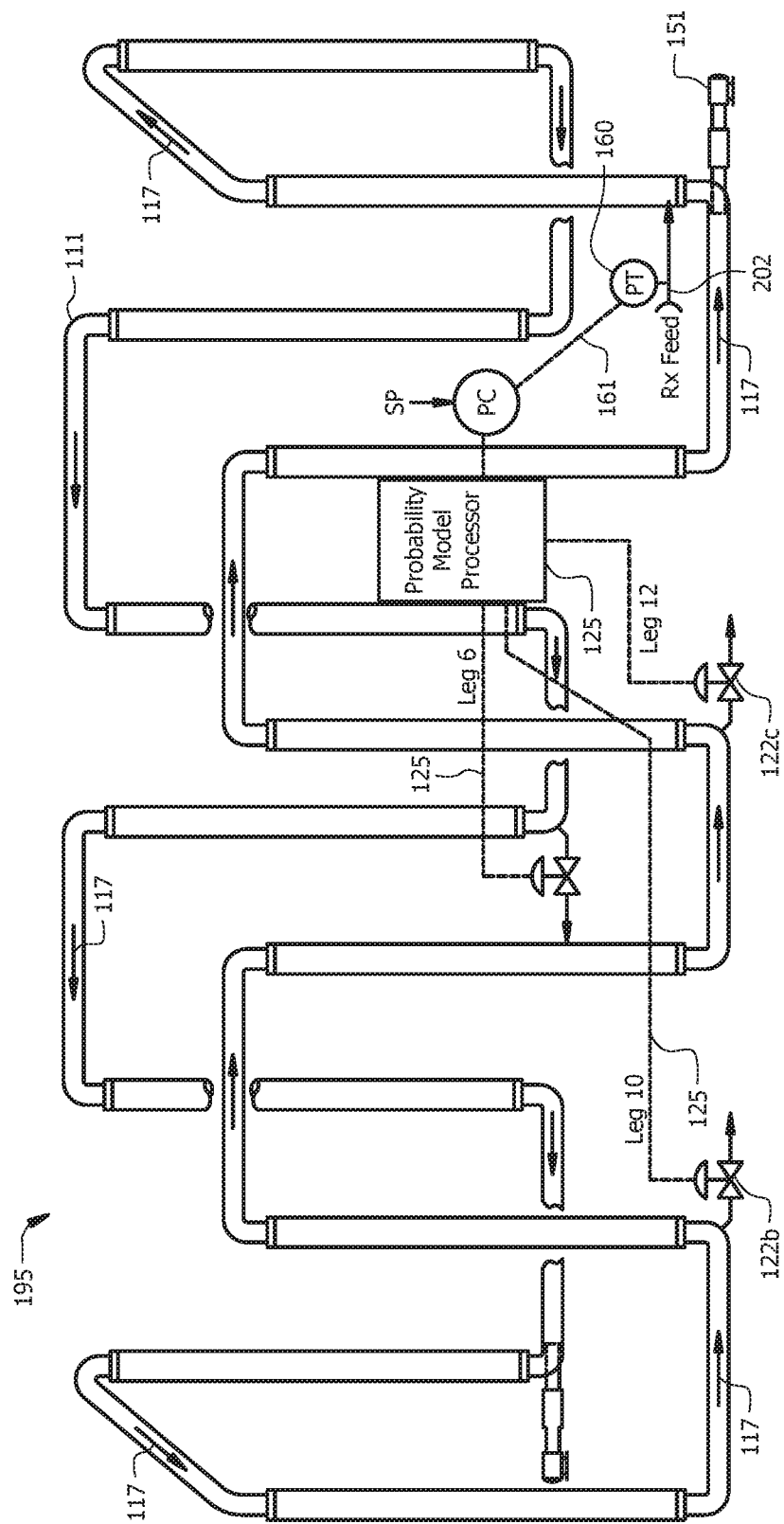
FIG. 4 schematically illustrates still yet another process flow diagram of an embodiment of a loop polymerization process.

An example of a polymerization system having a processor for developing a probability network is shown in FIG. 4, which illustrates a schematic process flow diagram of an embodiment of a polymerization system 195. The polymerization system 195 is similar to the polymerization system 190 described with respect to FIG. 3, and similar components will not be re-described in the interest of brevity. The main difference between the polymerization system 190 and the polymerization system 195 is the presence of the modeling unit comprising a processor 165 for executing a probability network model for various aspects of the polymerization process.

As shown in FIG. 4, the polymerization product can be produced in loop slurry polymerization reactor 111, wherein at least one motive device, such as pump 151, may circulate the fluid slurry (e.g., reaction mixture slurry) in the loop slurry polymerization reactor 111, wherein a direction of the flow can be according to the flow arrows 117. The polymerization system 195 can comprise a first takeoff valve 122a, a second takeoff valve 122b, and a third takeoff valve 122c, downstream of the pump 151. A pressure sensor 160 can measure the pressure in the reaction mixture slurry immediately downstream of the pump 151, wherein the pressure sensor 160 is in communication with a pressure controller 162 via a control line 161. The pressure controller 162 is in signal communication with the processor 165, wherein the processor 165 is in signal communication with the first takeoff valve 122a, the second takeoff valve 122b, the third takeoff valve 122c, or any combination thereof via one or more control lines 125.

The processor 165 can be configured to obtain readings from one or more sensors or components such as the pressure sensor 161, the pressure controller 162, pump power sensors, valve position sensors, temperature sensors, and the like. The processor can use the data to train, operate, or train and operate a probability network such as a Bayesian network. In some embodiments, the processor 165 and the pressure controller 162 can be the same device. For example, a controller or computer can serve as both the pressure controller and execute the probability network. In some embodiments, the processor 165 executing the probability network may be separate, but in signal communication with, the pressure controller 162.

According to the embodiment of FIG. 4, each takeoff valve can be controlled individually by the processor 165, the pressure controller 162, or both. In an embodiment, the processor 165 can generate a first time delay for the first correction, a second time delay for the second correction, and a third time delay for the third correction. The first time delay can be based on a time it takes for the reaction mixture slurry to travel from the first takeoff control valve 122a to the pump 151 in the polymerization reactor 111. The second time delay can be based on a time it takes for the reaction mixture slurry to travel from the second takeoff control valve 122b to the pump 151 in the polymerization reactor 111. The third time delay can be based on a time it takes for the reaction mixture slurry to travel from the third takeoff control valve 122c to the pump 151 in the polymerization reactor 111. The first correction can be applied to the first takeoff valve actuation signal after the first time delay. The second correction can be applied to the second takeoff valve actuation signal after the second time delay. The third correction can be applied to the third takeoff valve actuation signal after the third time delay. In this embodiment, the pressure controller 162 may determine the takeoff valve actuation signals and provide the signals to the processor 165, which may apply any corrections, time delays, or both before providing the takeoff valve actuation signals to the takeoff valves 122a, 122b, 122c.

In some embodiments, the Bayesian network can be used to review the operational parameters for the polymerization system such as the pressure sensor readings, the takeoff valve actuation signals, and the pump power to determine which operational parameters such as the position of the takeoff valves, if any, are causing other process conditions such as pressure fluctuations, pump power fluctuations, or both in the system. Such a system may allow the dominant or primary takeoff valves to be identified for control using the corrections described herein. In some embodiments, the Bayesian network may be used to identify which takeoff valves or other inputs are not causing pressure fluctuations, pump power fluctuations in the system, which may allow the pressure controller or other systems to be modified to avoid any attempts to control variables that will not affect the pressure, the pump power, or both, but which may create other instabilities in the polymerization process.

In an embodiment, a method for controlling a polymerization process as disclosed herein can use the Bayesian network to determine one or more conditions causally linked to a pump power fluctuations. In this embodiment, a reaction mixture slurry can be circulated in a polymerization reactor during a polymerization process. The polymerization reactor and polymerization process can include any of those systems, reactors, or processes described herein. In general, the reaction mixture slurry can comprise an olefin, a catalyst, and a polymer product. In such embodiment, the polymerization reactor can be a loop slurry reactor, a continuous stirred tank reactor, or a plug flow reactor.

At least one condition can be detected within the polymerization reactor during the polymerization process. The conditions generally comprise potential causes of the pump power fluctuations and can include any variables, properties, or controlled components within the polymerization reactor system. In an embodiment, the at least one condition can include, but is not limited to, a concentration of the olefin in the reaction mixture slurry, a concentration of the catalyst in the reaction mixture slurry, a concentration of the alpha olefin reaction product in the reaction mixture slurry, a composition of the catalyst, a composition of the olefin, a composition of the alpha olefin reaction product, a density of the reaction mixture slurry, a composition of the diluent, a pressure within the polymerization reactor, an average temperature of the reaction mixture slurry, a flowrate of the reaction mixture, a temperature of a coolant inlet in a heat transfer portion of the polymerization reactor, a position of one or more takeoff valves, and the like, or any combination thereof. In addition to the at least one condition, the pump power of one or more pumps can be detected within the polymerization loop reactor. The pump power can include an instantaneous or time averaged power level. The pump power can also include a deviation of the pump power. For example, the pump power can include a detected pump power as described herein that includes a pump power (e.g., an instantaneous or short-time averaged pump power) minus a time averaged pump power. This data can be stored as historical operational data.

A probability network can then be developed, where in some embodiments the probability network can be a Bayesian network. This can include using software to model the probability network, develop the tables, nodes, or rules or both model the probability network and develop the tables, nodes, or rules for operating the probability network. The at least one condition and pumping power, the pump power fluctuations, or both can be transferred to the probability network. In an embodiment, the probability network can use the data, such as the historical operational data, to train the model and determine the relative weightings for the nodes and conditional probabilities.

In some aspects of the systems and methods described herein, the probability network can be developed using historical operational data as described herein in addition to other derivations of the historical operational data. The historical operational data from one or more polymerization reactors 111, the polymerization system 195, and/or historical operational data from similar polymerization reactors 111 and/or polymerization systems 195 can be used to determine one or more process variables. For example, the historical operational data can be used as measured and/or various transformations of the data can be performed such as obtaining derivatives of one or more measurements (e.g., time based derivations to obtain rates, etc.), taking a ratio of one process measurement relative to another process measurement, or the like to obtain characteristic mathematical quantities representative of the polymerization process. The historical operation data can then is then combined with the characteristic mathematical quantities to form the probability network. The structure of the resulting probability network can be defined by a set of variables and the probabilistic relationships between them.

After developing the probability network. The probability network can be used to detect various events within the polymerization system 195 using an operation model. The operation model (which may run in a real time mode on a processor) can include time based measurements of any of the process variables, which may be transferred to a database accessible to the operation model and/or directly to the operation model. When the probability network is based on derivations of the data, the processor can determine the derivations of the measurement data for use with the model. The various data can then be sent to the probability network to produce estimate event probabilities and/or a likelihood of one or more causes. The event probabilities can be stored in a database and/or displayed for a user. The even probabilities can also be used with an alarm system to initiate one or more system alarms when the probabilities of certain events exceed set thresholds. The time based measurements used with the system can include any of those variable described as being measured herein.

In some aspects, the probability network can be used to determine if the at least one condition is a cause of the pumping power fluctuation. In some embodiments, the at least one condition can comprise a pressure change of the reaction mixture downstream of the pump, wherein the probability network can be used to determine the probability that the pressure change is a cause of the pumping power fluctuation. The determination may be provided as a probability that the at least one condition is a cause of the pumping power fluctuation. The probability can be compared to a threshold to determine if the probability is above the threshold. In embodiments where the probability that the at least one condition is a cause of the pumping power fluctuation is not above a threshold, the at least one condition would not be acted on to control or ameliorate the pumping power fluctuation. In embodiments where the probability that the at least one condition is a cause of the pumping power fluctuation is above a threshold, the at least one condition can be controlled in order to control or ameliorate the pumping power fluctuation. In an embodiment, the pumping power fluctuation can be reduced in response to controlling the at least one condition.

The use of the probability network can be used with the pressure change as at least one of the condition that is considered in the probability model. The pressure change of the reaction mixture slurry can be measured downstream of the at least one pump, the pressure can be controlled by generating a takeoff valve actuation signal for a takeoff valve based on the pressure change. In some embodiments, the pressure controller, which can include a processor and a memory, can generate a takeoff valve actuation signal directing the takeoff valve to move towards an open position or remain in an open position. In this position, a portion of the reaction mixture slurry can be continually removed from the polymerization reactor in proportion to the takeoff valve position. In other embodiments, the processor can generate a takeoff valve actuation signal directing the takeoff valve to move towards a closed position or remain in a closed position. In this position, the reaction mixture slurry can be retained in the polymerization reactor.

In an embodiment, the pressure controller can generate a correction to the takeoff valve actuation signal, which can be applied to the takeoff valve actuation signal to generate a corrected takeoff valve actuation signal. In such embodiment, the correction to the takeoff valve actuation signal can reduce a pump power fluctuation of the pump when compared to adjusting the position of the takeoff valve using the takeoff valve actuation signal without applying the correction. The correction can include any of the corrections described herein.

As described above, the pressure controller can generate a time delay based on a time that the reaction mixture slurry takes to flow from the pump to the takeoff valve, and the time delay can be used with the correction. In this embodiment, the correction can be applied to the takeoff valve actuation signal after the time delay. A position of the takeoff valve can then be adjusted in response to the corrected takeoff valve actuation signal. For example, when the pressure change is a pressure increase of the reaction mixture slurry, the takeoff valve actuation signal can cause the takeoff valve to move towards the open position in response to the pressure increase, and the correction, with or without the time delay, can reduce an amount to which the takeoff valve moves towards the open position. As another example, when the pressure change is a pressure decrease of the reaction mixture slurry, the takeoff valve actuation signal can cause the takeoff valve to move towards the closed position in response to the pressure decrease, and the correction, with or without the time delay, can reduce an amount to which the takeoff valve moves towards the closed position.

The use of the probability network can be extended to a polymerization process having multiple pumps, takeoff valves, or any combination thereof. In this embodiment, the probability network could be used to identify which takeoff valves, if any, cause pressure fluctuations, pump power fluctuations, or both. The use of the probability network may allow one or more factors such as one or more takeoff valves to be identified as not contributing to a pump power fluctuation for a specific pump or a group of pumps. For example, the probability network may demonstrate that only the nearest one or two takeoff valves upstream of a pump contribute to a specific pump's power fluctuations.

The probability network may also help to eliminate false positives and identify other conditions or components that do not contribute to the pump power fluctuations. Time can then be spent to control those conditions or components that do contribute to the pump power fluctuations. To achieve this revised control, the controllable variables not causally related to the process conditions can be removed from the process model and/or a weight of zero can be applied to these controllable variables. The probability network may also serve to identify conditions under which a problem with the polymerization process are occurring. For example, the probability network may be able to eliminate a takeoff valve position as causing a pump power fluctuation above a threshold. Such, identification may be useful in identifying upset conditions such as runaway reactor, a plugged reactor, a loss of reactants or catalysts, or the like that may initially be considered to be caused by the takeoff valve positions or other component configurations.

As part of controlling the polymerization process, a graphical display or output device can be used. In an embodiment, the method of controlling the polymerization process may also include graphically displaying at least a portion of a probability network graph. This may aid in identifying one or more of the conditions to be adjusted. The adjusted value of the at least one condition can then occur in response to graphically displaying the probability network.

In addition to being used to identify the relevant operation model parameters, a probability network such as a Bayesian network can also be used to determine a statue of the polymerization reactor. The probability network, such as a Bayesian network, can be developed as described herein. For example, the probability network can be developed using system data and optionally one or more derivatives or transformations of the data. In addition, the probability network can be developed by including the polymerization reactor status in the data. For example, historical data from the polymerization reactor and/or similar polymerization reactors can be used along with status states such as being operational, being in an upset condition with or without reasons for the upset, being in a runaway reactor state, being in a near plugged state, being in a plugged state, or the like. The resulting probability network can then be used along with the system measurements, operational data, and/or derivatized and/or transformed data to determine a status of one or more of the polymerization reactors during a polymerization process.

Figure 5:
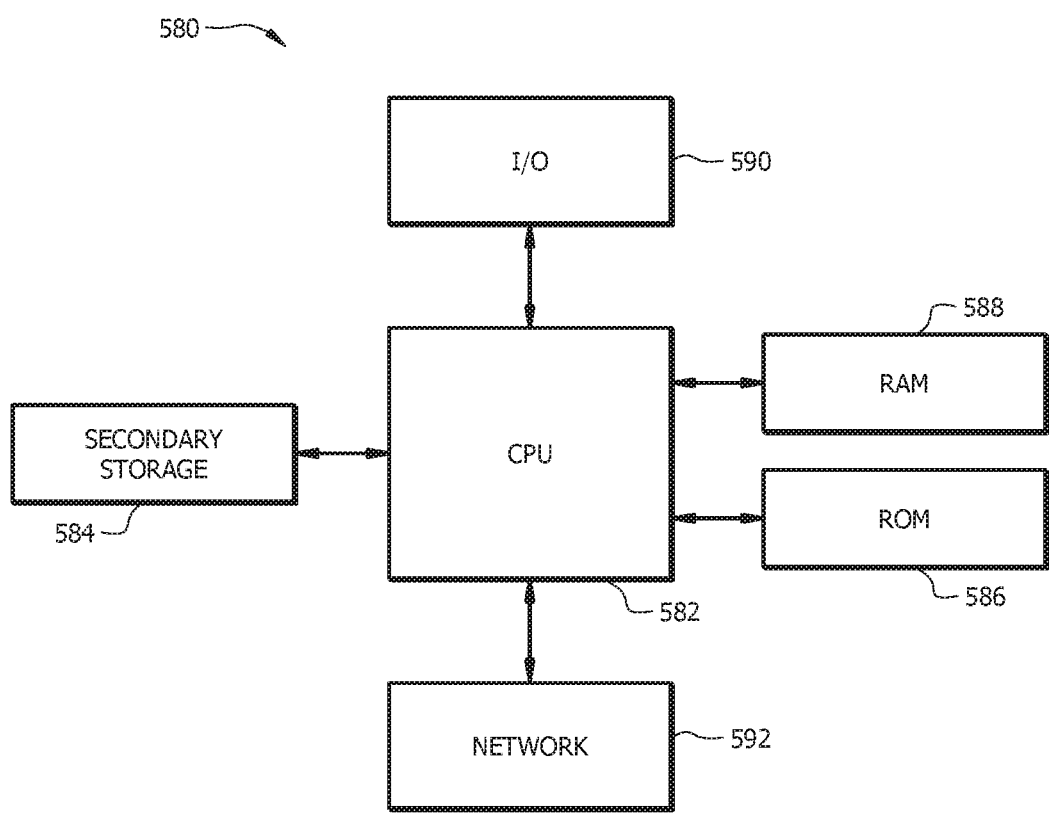
FIG. 5 illustrates a schematic layout of a computer system.

FIG. 5 illustrates a computer system 580 suitable for implementing one or more embodiments disclosed herein. In an embodiment, the computer system 580 may be used to store, execute, or store and execute one or more programs used for developing the probability network. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming, loading, or programming and loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed, loaded, or programmed and loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, the ROM 586, or any combination thereof may be referred to in some contexts as computer readable storage media, non-transitory computer readable media, or both.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), other air interface protocol radio transceiver cards, other well-known network devices, or any combination thereof. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal, the signal embedded in the carrier wave, or both may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, data, or any combination thereof that may be accessed from the secondary storage 584, for example, hard drives, floppy disks, optical disks, other device, the ROM 586, the RAM 588, or any combination thereof may be referred to in some contexts as non-transitory instructions non-transitory information, or both.

In an embodiment, the computer system 580 may comprise two or more computers in communication with each other that collaborate to perform a task. For example, but not by way of limitation, an application may be partitioned in such a way as to permit concurrent, parallel, or concurrent and parallel processing of the instructions of the application. Alternatively, the data processed by the application may be partitioned in such a way as to permit concurrent, parallel, or concurrent and parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application or applications in a cloud computing environment. Cloud computing may comprise providing computing services via a network connection using dynamically scalable computing resources. Cloud computing may be supported, at least in part, by virtualization software. A cloud computing environment may be established by an enterprise, may be hired on an as-needed basis from a third party provider, or both. Some cloud computing environments may comprise cloud computing resources owned and operated by the enterprise as well as cloud computing resources hired, leased, or both from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media, non-removable computer storage media, or both. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, to other non-volatile memory, or to any combination thereof and volatile memory of the computer system 580. The processor 582 may process the executable instructions, data structures, or both in part by directly accessing the computer program product, for example by reading from a CD-ROM disk inserted into a disk drive peripheral of the computer system 480. Alternatively, the processor 582 may process the executable instructions, data structures, or both by remotely accessing the computer program product, for example by downloading the executable instructions, the data structures, or both from a remote server through the network connectivity devices 592. The computer program product may comprise instructions that promote the loading, copying, or copying and loading of data, data structures, files, executable instructions, or any combination thereof to the secondary storage 584, to the ROM 586, to the RAM 588, to other non-volatile memory, or to any combination thereof and volatile memory of the computer system 580.

In some contexts, the secondary storage 584, the ROM 586, and the RAM 588 may be referred to as a non-transitory computer readable medium or a computer readable storage media. A dynamic RAM embodiment of the RAM 588, likewise, may be referred to as a non-transitory computer readable medium in that while the dynamic RAM receives electrical power and is operated in accordance with its design, for example during a period of time during which the computer system 580 is turned on and operational, the dynamic RAM stores information that is written to it. Similarly, the processor 582 may comprise an internal RAM, an internal ROM, a cache memory, other internal non-transitory storage blocks, sections, or components that may be referred to in some contexts as non-transitory computer readable media or computer readable storage media.

ADDITIONAL DESCRIPTION

Processes and systems for the controlling a polymerization process in a loop polymerization reactor have been described. The following are a first set of non-limiting, specific examples and aspects of the processes and systems in accordance with the present disclosure:

In a first aspect, a polymerization process comprises: circulating, with a pump, a reaction mixture slurry in a polymerization loop reactor during a polymerization process, wherein the reaction mixture slurry comprises an olefin, a catalyst, and polymer particles; detecting a pressure change in the reaction mixture slurry downstream of the pump; generating, by a pressure controller, a takeoff valve actuation signal for a takeoff valve based on the pressure change, wherein a portion of the reaction mixture slurry is continually removed from the polymerization reactor in proportion to the takeoff valve position, and wherein the reaction mixture slurry is retained in the polymerization reactor when the takeoff valve is in a closed position, wherein the reactor pressure is based on the takeoff valve position; generating, by the pressure controller, a correction to the takeoff valve actuation signal; generating, by the pressure controller, a time delay for the correction; applying the correction to the takeoff valve actuation signal to generate a corrected takeoff valve actuation signal; providing the corrected takeoff valve actuation signal to the takeoff valve after the time delay; and adjusting a position of the takeoff valve in response to providing the corrected takeoff valve actuation signal.

A second aspect can include the polymerization process of the first aspect, wherein the pressure change is a pressure increase of the reaction mixture slurry, and wherein the takeoff valve actuation signal causes the takeoff valve to move towards the open position in response to the pressure increase, and wherein the correction reduces an amount to which the takeoff valve moves towards the open position.

A third aspect can include the polymerization process of the first aspect, wherein the pressure change is a pressure decrease of the reaction mixture slurry, and wherein the takeoff valve actuation signal causes the takeoff valve to move towards the closed position in response to the pressure increase, and wherein the correction reduces an amount to which the takeoff valve moves towards the closed position.

A fourth aspect can include the polymerization process of any of the first to third aspects, wherein the time delay is based on a time for the reaction mixture to flow from the pump to the takeoff valve in the polymerization reactor.

A fifth aspect can include the polymerization process of any of the first to fourth aspects, wherein a magnitude of the correction is based on a change in a pump power of the pump relative to a time average of the pump power, wherein the time average of the pump power is an average pump power over a time corresponding to between 1 and 10 circulation periods of the reaction mixture slurry through the polymerization loop reactor.

A sixth aspect can include the polymerization process of any of the first to fifth aspects, wherein applying the correction reduces a pump power fluctuation of the pump compared to adjusting the position of the takeoff valve using the takeoff valve actuation signal without applying the correction.

A seventh aspect can include the polymerization process of any of the first to sixth aspects, wherein the correction is between about 0.1% and about 1% of a signal range of the takeoff valve actuation signal.

An eighth aspect can include the polymerization process of the seventh aspect, further comprising applying a tuning factor between about 1% and about 50% to the correction prior to applying the correction to the takeoff valve actuation signal.

A ninth aspect can include the polymerization process of any of the first to eighth aspects, wherein the pump is at least one of an axial flow pump, a mix flow pump, or a radial flow pump.

A tenth aspect can include the polymerization process of any of the first to ninth aspects, wherein a concentration of the polymer particles in the reaction mixture slurry is greater than about 40 wt %.

An eleventh aspect can include the polymerization process of the tenth aspect, wherein the concentration of the polymer particles in an outlet line downstream of the takeoff valve is greater than an average polymer particle concentration of the reaction mixture.

In a twelfth aspect, a polymerization process comprises circulating a reaction mixture slurry in a polymerization loop reactor during a polymerization process; wherein the reaction mixture slurry comprises an olefin, a catalyst, and a polymer product, and wherein the polymerization loop reactor comprises a pump, wherein the pump is disposed in-line in the polymerization loop reactor, wherein a pressure sensor is disposed downstream of the pump, wherein a first takeoff valve is disposed downstream of the pump, and wherein a second takeoff valve is disposed downstream of the first takeoff valve; detecting a pressure change in the reaction mixture slurry at the pressure sensor; generating, by a pressure controller in signal communication with the pressure sensor, a first takeoff valve actuation signal for the first takeoff valve and a second takeoff valve actuation signal for the second takeoff valve based on the pressure change; generating, by the pressure controller, a first correction to the first takeoff valve actuation signal; generating, by the pressure controller, a first time delay for the first correction, wherein the first time delay is based on a distance between the first takeoff control valve and the pump; applying the first correction to the first takeoff valve actuation signal after the first time delay to generate a first corrected takeoff valve actuation signal; generating, by the pressure controller, a second correction to the second takeoff valve actuation signal; generating, by the pressure controller, a second time delay for the second correction, wherein the second time delay is based on a distance between the second takeoff control valve and the pump; applying the second correction to the second takeoff valve actuation signal after the second time delay to generate a second corrected takeoff valve actuation signal; and adjusting a position of the takeoff valve during the polymerization process in response to the first corrected takeoff valve actuation signal and the second corrected takeoff valve actuation signal.

A thirteenth aspect can include the polymerization process of the twelfth aspect, further comprising: removing a portion of the reaction mixture slurry from the polymerization loop reactor the first takeoff valve, the second takeoff valve, or both, wherein a portion of the reaction mixture slurry is removed from the polymerization reactor when the first takeoff valve, the second takeoff valve, or both are in an open position, and wherein the reaction mixture slurry is retained in the polymerization reactor when the first takeoff valve, the second takeoff valve, or both are in a closed position, and wherein adjusting the position of the first takeoff valve, the second takeoff valve, or both comprises moving the first takeoff valve, the second takeoff valve, or both towards the open position; and changing the concentration of polymer particles downstream of the first takeoff valve, the second takeoff valve, or both in response to moving the first takeoff valve, the second takeoff valve, or both towards the open position.

A fourteenth aspect can include the polymerization process of the twelfth or thirteenth aspect, further comprising: generating a pressure reduction at the first pressure sensor or the second pressure sensor in response to changing the concentration of polymer particles of the reaction mixture downstream of the takeoff valve.

A fifteenth aspect can include the polymerization process of any of the twelfth to fourteenth aspects, wherein a magnitude of the one or more corrections is based on a change in a pump power of the pump.

A sixteenth aspect can include the polymerization process of any of the twelfth to fifteenth aspects, wherein the one or more corrections comprise a portion of a signal range of the takeoff valve actuation signal.

A seventeenth aspect can include the polymerization process of the sixteenth aspect, wherein the one or more corrections are limited to between about 0.1% and about 1% of the signal range of the takeoff valve actuation signal.

In an eighteenth aspect, a method of controlling a polymerization process comprises circulating a reaction mixture slurry in a polymerization reactor during a polymerization process, wherein the reaction mixture slurry comprises an olefin, a catalyst, and a polymer product; detecting, by sensor, at least one condition within the polymerization reactor during the polymerization process; detecting, by a pump power sensor, a pumping power fluctuation of at least one pump used in the circulating of the reaction mixture slurry; developing, by a processor, a probability network; transferring the at least one condition and the pumping power fluctuation to the probability network; determining, by the processor, the probability that the at least one condition is a cause of the pumping power fluctuation; determining that the probability that the at least one condition is a cause of the pumping power fluctuation is above a threshold; controlling the at least one condition when the probability that the at least one condition is a cause of the pumping power fluctuation is above a threshold; and reducing the pumping power fluctuation in response to controlling the at least one condition.

A nineteenth aspect can include the method of the eighteenth aspect, wherein the probability network is a Bayesian network.

A twentieth aspect can include the method of the eighteenth or nineteenth aspect, wherein the at least one condition comprises a pressure change of the reaction mixture slurry downstream of the at least one pump, and wherein controlling the at least one condition comprises: generating, by the processor, a takeoff valve actuation signal for a takeoff valve based on the pressure change; generating, by the processor, a correction to the takeoff valve actuation signal; applying the correction to the takeoff valve actuation signal to generate a corrected takeoff valve actuation signal; and adjusting a position of the takeoff valve in response to the corrected takeoff valve actuation signal.

A twenty first aspect can include the method of the twentieth aspect, wherein controlling the at least one condition further comprises: generating, by the processor, a time delay for the correction, wherein applying the correction comprises applying the correction to the takeoff valve actuation signal after the time delay.

A twenty second aspect can include the method of the twenty first aspect, wherein the time delay is based on a time for the reaction mixture slurry to travel from the takeoff control valve to the at least one pump.

A twenty third aspect can include the method of the twenty first or twenty second aspect, wherein the correction is between about 0.1% and about 1% of a signal range of the takeoff valve actuation signal.

A twenty fourth aspect can include the method of the twenty third aspect, further comprising applying a tuning factor between about 1% and about 50% to the correction prior to applying the correction to the takeoff valve actuation signal.

A twenty fifth aspect can include the method of any of the eighteenth to twenty fourth aspects, wherein the at least one condition comprises one or more of: a concentration of the olefin in the reaction mixture slurry, a concentration of the catalyst in the reaction mixture slurry, a concentration of the alpha olefin reaction product in the reaction mixture slurry, a composition of the catalyst, a composition of the olefin, a composition of the alpha olefin reaction product, a density of the reaction mixture slurry, a composition of the diluent, a pressure within the polymerization reactor, an average temperature of the reaction mixture slurry, a flowrate of the reaction mixture, a temperature of a coolant inlet in a heat transfer portion of the polymerization reactor, or any combination thereof.

A twenty sixth aspect can include the method of any of the eighteenth to twenty fifth aspects, wherein the polymerization reactor is a loop slurry reactor, a continuous stirred tank reactor, or a plug flow reactor.

In a twenty seventh aspect, a method for characterizing a polymerization reactor comprising a plurality of reaction zones comprises: providing an operation model of the polymerization reactor, wherein the operation model comprises a plurality of production variables and corresponding production variable weights; obtaining production data measurements of the plurality of production variables from the plurality of reaction zones within the polymerization reactor during operation of the polymerization reactor; transferring the production data measurements to a probability network; and determining a probability that each production variable of the plurality of production variables has an effect on the operation of the polymerization reactor.

A twenty eighth aspect can include the method of the twenty seventh aspect, further comprising: removing one or more production variables of the plurality of production variables to provide a second plurality of production variables, wherein the probability that each production variable removed is below a threshold; and operating the polymerization reactor using the operation model with the second plurality of production variables.

A twenty ninth aspect can include the method of the twenty seventh or twenty eighth aspect, further comprising: updating one or more of the production variable weights of the second plurality of production variables; wherein operating the polymerization reactor using the operation model with the second plurality of production variables comprises operating the polymerization reactor using the operation model with the second plurality of production variables and the updated one or more production variable weights.

A thirtieth aspect can include the method of any of the twenty seventh to twenty ninth aspects, wherein the plurality of production variables comprise two or more of: a pump power, a melt index of a polymer product, or a molecular weight of a polymer product.

A thirty first aspect can include the method of the thirtieth aspect, wherein the plurality of production variables further comprise one or more of: a concentration of an olefin in a reaction mixture slurry, a concentration of a catalyst in the reaction mixture slurry, a concentration of an alpha olefin reaction product in the reaction mixture slurry, a composition of the catalyst, a composition of the olefin, a composition of the alpha olefin reaction product, a density of the reaction mixture slurry, a composition of a diluent, a pressure within the polymerization reactor, an average temperature of the reaction mixture slurry, a flowrate of the reaction mixture slurry, a temperature of a coolant inlet in a heat transfer portion of the polymerization reactor, or any combination thereof.

A thirty second aspect can include the method of any of the twenty seventh to thirty first aspects, further comprising: determining one or more transformations of the production data measurements; transferring the one or more transformations of the production data measurements to the probability network; and determining the probability that one or more production variables of the plurality of production variables has an effect on the operation of the polymerization reactor based on the one or more transformations of the production data.

A thirty third aspect can include the method of the thirty second aspect, wherein the one or more transformations comprise a time based rate of change of one or more of the production data measurements.

A thirty fourth aspect can include the method of any of the twenty seventh to thirty third aspects, wherein the polymerization reactor is a loop slurry reactor, a continuous stirred tank reactor, or a plug flow reactor.

A thirty fifth aspect can include the method of any of the twenty seventh to thirty fourth aspects, wherein the probability network comprises a Bayesian network, and wherein the Bayesian network is defined by a set of the plurality of production variables and a set of probabilistic relationship between the set of the production variables.

In a thirty sixth aspect, a method for monitoring the status of a polymerization reactor comprises: measuring one or more operational parameters within a polymerization reactor during a polymerization process; transferring the one or more operational parameters to a probability network, wherein the probability network is developed using historical data for a polymerization system, wherein the historical data comprises data for the one or more operational parameters and corresponding event data; determining a probability of a state of the polymerization reactor using the probability network with the one or more operational parameters within the polymerization reactor.

A thirty seventh aspect can include the method of the thirty sixth aspect, further comprising: determining one or more transformations of the one or more operation parameters, wherein the probability network is further developed based on the one or more transformations; and transferring the one or more transformations to the probability network, wherein determining the probability of the event comprises using the probability network with the one or more transformations.

A thirty eighth aspect can include the method of the thirty sixth or thirty seventh aspect, wherein the one or more operational parameters comprise at least one of: a pump power, a melt index of a polymer product, a molecular weight of a polymer product, a concentration of an olefin in a reaction mixture slurry, a concentration of a catalyst in the reaction mixture slurry, a concentration of an alpha olefin reaction product in the reaction mixture slurry, a composition of the catalyst, a composition of the olefin, a composition of the alpha olefin reaction product, a density of the reaction mixture slurry, a composition of a diluent, a pressure within the polymerization reactor, an average temperature of the reaction mixture slurry, a flowrate of the reaction mixture slurry, a temperature of a coolant inlet in a heat transfer portion of the polymerization reactor, or any combination thereof.

A thirty ninth aspect can include the method of any of the thirty sixth to thirty eighth aspects, wherein the event comprises at least one of: an operational state, an upset condition state, a runaway reactor state, a near plugged state, or a plugged state.

A fortieth aspect can include the method of any of the thirty sixth to thirty ninth aspects, wherein the probability network is a Bayesian network.

A forty first aspect can include the method of the fortieth aspect, wherein the Bayesian network is defined by a set of the plurality of production variables and a set of probabilistic relationship between the set of the production variables.

In a forty second aspect, a system for monitoring a polymerization production facility comprising at least one polymerization reactor, each polymerization reactor having a plurality of reaction zones therein, comprises: a memory; a processor; and a monitoring application stored in the memory, wherein the operation model, when executed on the processor, configures the processor to: obtain production data measurements of a plurality of production variables from the plurality of reaction zones within the at least one polymerization reactor during operation of the polymerization reactor; determine a probability of one or more events within the polymerization reactor using the production data measurements with a probability network; and output an indication of a probability of the one or more events.

A forty third aspect can include the system of the forty second aspect, further comprising: an operation model stored in the memory, wherein the operation model, when executed on the processor, configures the processor to: determine one or more control signals based on the production data measurements; and send the one or more control signals to one or more components within the polymerization reactor.

A forty fourth aspect can include the system of the forty third aspect, wherein the monitoring application further configures the processor to: determining a probability that each production variable of the plurality of production variables has an effect on the operation of the polymerization reactor; and remove one or more production variables of the plurality of production variables to provide a second plurality of production variables, wherein the probability that each production variable removed is below a threshold.

A forty fifth aspect can include the system of the forty fourth aspect, wherein the operation model further configures the processor to: determine one or more control signals based on the production data measurements for the second plurality of production variables.

A forty sixth aspect can include the system of any of the forty second to forty fifth aspects, wherein the probability network comprises a Bayesian network, and wherein the Bayesian network is defined by a set of the plurality of production variables and a set of probabilistic relationship between the set of the production variables.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the disclosure is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for characterizing a polymerization reactor comprising a plurality of reaction zones, the method comprising:
    providing measurements of one or more operational parameters within the polymerization reactor, wherein the one or more operational parameters comprises a plurality of production variables and corresponding production variable weights;
    obtaining production data measurements of the plurality of production variables from the plurality of reaction zones within the polymerization reactor during operation of the polymerization reactor;
    transferring the production data measurements to a probability network, wherein the probability network is a Bayesian network; and
    determining a probability that each production variable of the plurality of production variables has an effect on the operation of the polymerization reactor.

2. The method of claim 1, further comprising: removing one or more production variables of the plurality of production variables to provide a second plurality of production variables, wherein the probability that each production variable removed is below a threshold; and
    operating the polymerization reactor using the one or more operational parameters including the second plurality of production variables.

3. The method of claim 2, further comprising: updating one or more of the production variable weights of the second plurality of production variables; wherein operating the polymerization reactor using the one or more operational parameters including the second plurality of production variables comprises operating the polymerization reactor using the second plurality of production variables and the updated one or more production variable weights.

4. The method of claim 1, wherein the plurality of production variables comprise two or more of: a pump power, a melt index of a polymer product, or a molecular weight of the polymer product.

5. The method of claim 4, wherein the plurality of production variables further one or more of: a concentration of an olefin in a reaction mixture slurry, a concentration of a catalyst in the reaction mixture slurry, a concentration of an alpha olefin reaction product in the reaction mixture slurry, a composition of the catalyst, a composition of the olefin, a composition of the alpha olefin reaction product, a density of the reaction mixture slurry, a composition of a diluent, a pressure within the polymerization reactor, an average temperature of the reaction mixture slurry, a flow-rate of the reaction mixture slurry, a temperature of a coolant inlet in a heat transfer portion of the polymerization reactor, or any combination thereof.

6. The method of claim 1, further comprising:
    determining one or more transformations of the production data measurements;
    transferring the one or more transformations of the production data measurements to the probability network; and
    determining the probability that one or more production variables of the plurality of production variables has an effect on the operation of the polymerization reactor based on the one or more transformations of the production data measurements.

7. The method of claim 6, wherein the one or more transformations comprise a time based rate of change of one or more of the production data measurements.

8. The method of claim 1, wherein the polymerization reactor is a loop slurry reactor, a continuous stirred tank reactor, or a plug flow reactor.

9. The method of claim 1, wherein the Bayesian network is defined by a set of the plurality of production variables and a set of probabilistic relationship between the set of the production variables.

10. A method for monitoring the status of a polymerization reactor comprises:
    measuring one or more operational parameters within a polymerization reactor during a polymerization process;
    transferring the one or more operational parameters to a probability network,
        wherein the probability network is developed using historical data for a polymerization system,
        wherein the historical data comprises data for the one or more operational parameters and corresponding event data,
        wherein the one or more operational parameters comprise a plurality of production variables, and
        wherein the probability network is a Bayesian network; and
    determining a probability of a state of the polymerization reactor using the probability network with the one or more operational parameters within the polymerization reactor.

11. The method of claim 10, further comprising: determining one or more transformations of the one or more operational parameters, wherein the probability network is further developed based on the one or more transformations; and transferring the one or more transformations to the probability network, wherein determining the probability of the state comprises using the probability network with the one or more transformations.

12. The method of claim 10, wherein the one or more operational parameters comprise at least one of: a pump power, a melt index of a polymer product, a molecular weight of polymer product, a concentration of an olefin in a reaction mixture slurry, a concentration of a catalyst in the reaction mixture slurry, a concentration of an alpha olefin reaction product in the reaction mixture slurry, a composition of the catalyst, a composition of the olefin, a composition of the alpha olefin reaction product, a density of the reaction mixture slurry, a composition of a diluent, a pressure within the polymerization reactor, an average temperature of the reaction mixture slurry, a flowrate of the reaction mixture slurry, a temperature of a coolant inlet in a heat transfer portion of the polymerization reactor, or any combination thereof.

13. The method of claim 10, wherein the state comprises at least one of: an operational state, an upset condition state, a runaway reactor state, a near plugged state, or a plugged state.

14. The method of claim 10, wherein the Bayesian network is defined by a set of the plurality of production variables and a set of probabilistic relationship between the set of the plurality of production variables.

15. A system for monitoring a polymerization production facility comprising at least one polymerization reactor having a plurality of reaction zones disposed therein, the system comprises:
   a memory;
   a processor; and
   a monitoring application stored in the memory, wherein the monitoring application, when executed on the processor, configures the processor to: obtain production data measurements of a plurality of production variables from the plurality of reaction zones within the at least one polymerization reactor during operation of the polymerization reactor; determine a probability of one or more events within the polymerization reactor using the production data measurements with a probability network, wherein the probability network is a Bayesian network; and output an indication of a probability of the one or more events.

16. The system of claim 15, wherein the monitoring application further configures the processor to: determine one or more control signals based on the production data measurements; and send the one or more control signals to one or more components within the polymerization reactor.

17. The system of claim 16, wherein the monitoring application further configures the processor to: determine a probability that each production variable of the plurality of production variables has an effect on the operation of the polymerization reactor; and remove one or more production variables of the plurality of production variables to provide a second plurality of production variables, wherein the probability that each production variable removed is below a threshold.

18. The system of claim 17, wherein the monitoring application further configures the processor to: determine one or more control signals based on production data measurements for the second plurality of production variables.

19. The system of claim 15, wherein the Bayesian network is defined by a set of the plurality of production variables and a set of probabilistic relationship between the set of the plurality of production variables.

20. The method of claim 10, wherein the at least one polymerization reactor is a loop slurry reactor, a continuous stirred tank reactor, or a plug flow reactor.

* * * * *